US012762045B2

(12) United States Patent
Xhafa et al.

(10) Patent No.: US 12,762,045 B2
(45) Date of Patent: Oct. 13, 2026

(54) METHODS, SYSTEMS, AND DEVICES FOR WEBPAGE DIAGNOSTICS

(71) Applicant: Behamics AG, St. Gallen (CH)

(72) Inventors: Valon Xhafa, New York, NY (US); Agon Pllana, Prishtine (XK); Thilo Pfrang, Zürich (CH)

(73) Assignee: Behamics AG, St. Gallen (CH)

( * ) Notice: Subject to any disclaimer, the term of this patent is extended or adjusted under 35 U.S.C. 154(b) by 240 days.

(21) Appl. No.: 18/658,226

(22) Filed: May 8, 2024

(65) Prior Publication Data

US 2024/0378142 A1 Nov. 14, 2024

Related U.S. Application Data

(60) Provisional application No. 63/465,450, filed on May 10, 2023.

(51) Int. Cl.
*G06F 11/3668* (2025.01)
*G06F 11/3698* (2025.01)

(52) U.S. Cl.
CPC ...... *G06F 11/3692* (2013.01); *G06F 11/3698* (2025.01)

(58) Field of Classification Search
CPC ......................... G06F 11/3692; G06F 11/3698
USPC .................................................. 717/124–133
See application file for complete search history.

(56) References Cited

U.S. PATENT DOCUMENTS

| | | | | |
|---|---|---|---|---|
| 6,954,789 | B2 * | 10/2005 | Dietz | H04L 69/161 709/224 |
| 9,578,046 | B2 * | 2/2017 | Baker | H04L 63/1416 |
| 10,009,366 | B2 * | 6/2018 | Lefebvre | H04L 43/04 |
| 11,399,037 | B2 * | 7/2022 | Cavallari | G06F 21/552 |
| 11,463,464 | B2 * | 10/2022 | Zadeh | H04L 61/103 |
| 12,013,852 | B1 * | 6/2024 | Echeverria | G06F 16/24532 |
| 12,143,300 | B2 * | 11/2024 | Al-Damluji | H04L 45/566 |

OTHER PUBLICATIONS

Wang et al., "Detection Network Anomalies Based on Packet and Flow Analysis", 2008, IEEE, pp. 497-502. (Year: 2008).*

(Continued)

*Primary Examiner* — Ted T. Vo
(74) *Attorney, Agent, or Firm* — McDonnell Boehnen Hulbert & Berghoff LLP

(57) ABSTRACT

In one aspect, an example computer-implemented method includes (a) receiving, from a client computing platform, a first plurality of time-indexed data packets indicative of user activity associated with a user of the client computing platform; (b) receiving, from the client computing platform, a second plurality of time-indexed data packets indicative of one or more anomalies at the client computing platform; (c) comparing the first and second plurality of time-indexed data packets to determine whether a particular anomaly caused a change in user intent of the user to perform a particular activity at the client computing platform; (d) based upon a determination that the particular anomaly caused the change in user intent, determining, for the particular anomaly, an estimated loss of a client resource at the client computing platform; and (e) displaying, by a graphical user interface, a graphical representation of the particular anomaly and the estimated loss.

26 Claims, 16 Drawing Sheets

(56) References Cited

OTHER PUBLICATIONS

Gui et al., "Anomaly Detection on Web-User Behaviors Through Deep Learning", 2020, NEC Laboratories America, Inc., pp. 467-473. (Year: 2020).*
Choi et al., "Deep Learning for Anomaly Detection in Time-Series Data: Review, Analysis, and Guidelines", 2021, IEEE Access, 23 pages. (Year: 2021).*
Bentz, Mickael, "How to Check for Website Errors and Why It's Essential for Your Business," Contentsquare, Apr. 1, 2022, 13 pages.

* cited by examiner

500

| variable_name | shap_impact | description |
|---|---|---|
| product_reviews | -0.069 | The average number of reviews of viseted products |
| day | 0.0256 | Day of week |
| added_to_cart_price_mean | -0.0182 | The average price of all items added to the cart |
| LANDING_REFERRER_MAIL | -0.0173 | The percentage of users that came from the Mail sites |
| total_time_price_filter_used | -0.0163 | The percentage usage of the Price filter in Product Lists |
| Windows | 0.0148 | The percentage of users using Windows platform |
| LANDING_REFERRER_facebook | 0.0143 | The percentage of users that came from the Facebook site |
| mobile | 0.0131 | The percentage of users using mobile |
| in_discount_mean | -0.0122 | The percentage of products visited that were in discount |
| total_time_sort_used | 0.0122 | The percentage usage of the Sort filter in Product Lists |
| product_ratings | -0.0094 | The average number of ratings of viseted products |
| Other_browser | 0.0091 | The percentage of users using Other browsers |
| Firefox | -0.0088 | The percentage of users using Firefox browser |
| PP_total_price | 0.0077 | The average price of viseted products |
| nr_not_availability_mean | 0.0075 | The percentage of products visited that were out of stock |
| Safari | -0.0071 | The percentage of users using Safari browser |
| total_time_color_filter_used | 0.0055 | The percentage usage of the Color filter in Product Lists |
| cart_items_on_return | 0.0054 | The average number of products in the user's cart when they came back |
| total_time_sale_used | 0.0049 | The percentage usage of the Sale filter in Product Lists |
| sizes_perc_mean | 0.0047 | The percentage of product sizes that are available |
| desktop | 0.0047 | The percentage of users using desktop |
| Linux | -0.0043 | The percentage of users using Linux platform |
| iOS | -0.0038 | The percentage of users using iOS platform |
| total_time_new_used | 0.0037 | The percentage usage of the New filter in Product Lists |
| total_time_size_filter_used | -0.0028 | The percentage usage of the Size filter in Product Lists |
| LANDING_REFERRER_bing | -0.0025 | The percentage of users that came from the Bing site |
| PP_total_discount | -0.0024 | The average discount value of visited products |
| LANDING_REFERRER_DIRECTLY | 0.0021 | The percentage of users that came directly to the store |
| Mac OS | -0.002 | The percentage of users using MacOS platform |
| total_time_search_used | -0.0019 | The percentage usage of the Search filter in Product Lists |
| Other_platform | -0.0011 | The percentage of users using Other platforms |
| on_sale_Product_List | 0.0009 | The percentage of Product Lists visited that were on sale |
| Chrome | 0.0007 | The percentage of users using Chrome browser |
| LANDING_REFERRER_OTHER | -0.0005 | The percentage of users that came from other sites |
| Android | 0.0002 | The percentage of users using Android platform |
| LANDING_REFERRER_google | 0.0002 | The percentage of users that came from the Google site |

Figure 5

METHODS, SYSTEMS, AND DEVICES FOR WEBPAGE DIAGNOSTICS

CROSS-REFERENCE TO RELATED APPLICATIONS

This application claims priority to U.S. Provisional Patent Application No. 63/465,450, filed on May 10, 2023, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example computer-implemented method is disclosed. The method includes (a) receiving, by a diagnostics platform and from a client computing platform, a first plurality of time-indexed data packets indicative of user activity associated with a user of the client computing platform; (b) receiving, by the diagnostics platform and from the client computing platform, a second plurality of time-indexed data packets indicative of one or more anomalies at the client computing platform; (c) comparing, by the diagnostics platform, the first and second plurality of time-indexed data packets to determine whether a particular anomaly caused a change in user intent of the user to perform a particular activity at the client computing platform; (d) based upon a determination that the particular anomaly caused the change in user intent, determining, by the diagnostics platform and for the particular anomaly, an estimated loss of a client resource at the client computing platform; and (c) displaying, by a graphical user interface of the diagnostics platform, a graphical representation of the particular anomaly and the estimated loss.

In another aspect, an example computer-implemented method is disclosed. The method includes (a) determining, by a diagnostics platform and from a client computing platform, a first time series indicative of one or more performance metrics at the client computing platform; (b) detecting, by the diagnostics platform and based on the first time series, an occurrence of a particular anomaly at a particular time in a performance of the client computing platform; (c) determining, in response to the detecting and based on a second time series indicative of user activity associated with a user of the client computing platform, whether the particular anomaly caused a change in user intent of the user to perform a particular activity at the client computing platform at the particular time; (d) based upon a determination that the particular anomaly caused the change in user intent, determining, by the diagnostics platform and for the particular anomaly, an estimated loss of a client resource at the client computing platform; and (c) displaying, by a graphical user interface of the diagnostics platform, a graphical representation of the particular anomaly and the estimated loss.

In another aspect, one or more non-transitory computer-readable media storing software comprising instructions executable by one or more processors that, upon such execution, cause the one or more processors to perform operations comprising the methods described herein is disclosed.

In another aspect, an electronic system is disclosed. In examples, the electronic system comprises one or more processing devices and one or more machine-readable storage devices for storing instructions that are executable by the one or more processing devices to perform operations comprising the methods described herein.

BRIEF DESCRIPTION OF THE DRAWINGS

FIG. 5 is a list of variables and their associated description.

DETAILED DESCRIPTION

I. Overview

Figure 1:
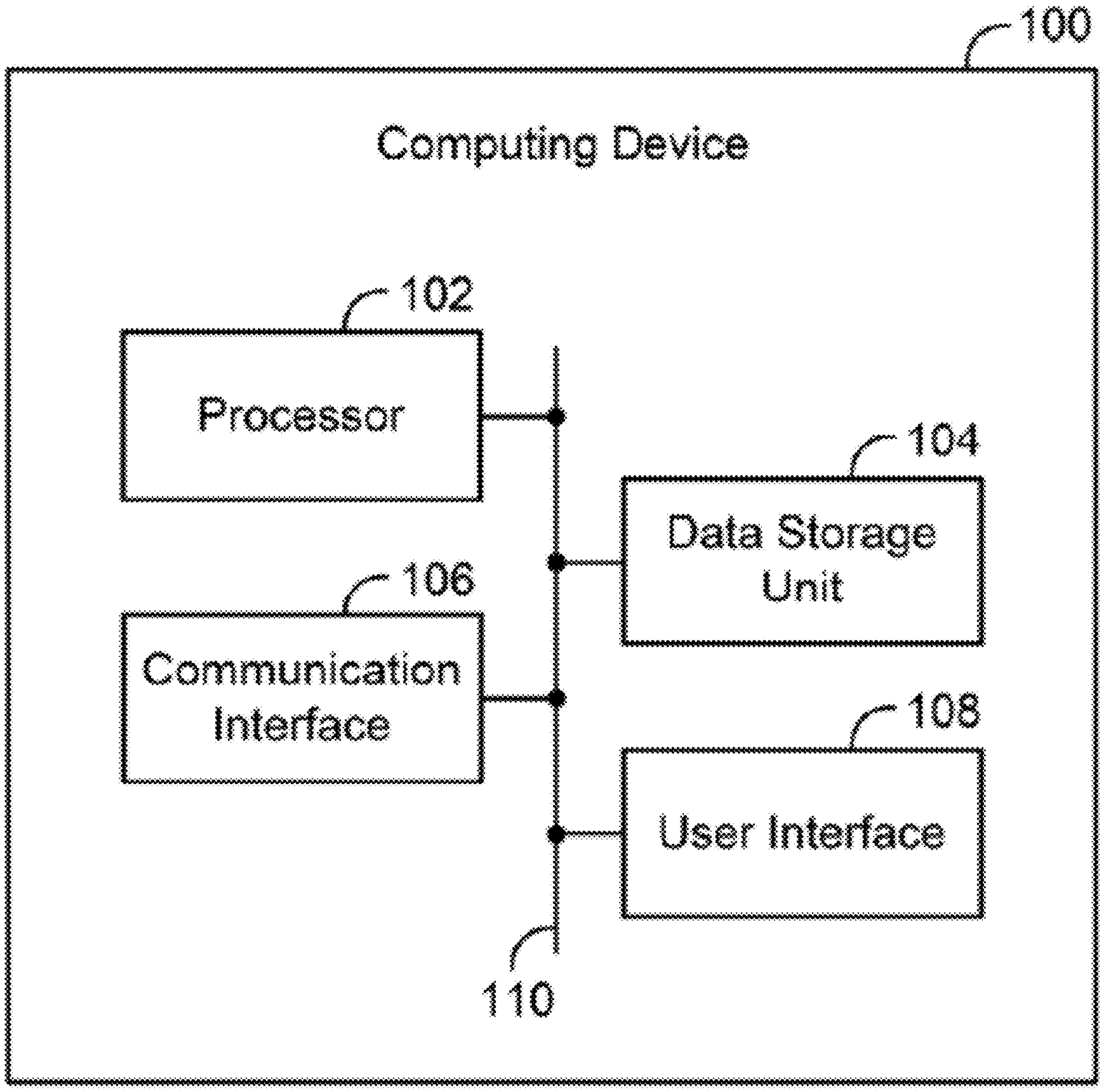
FIG. 1 is a simplified block diagram of an example computing device.

Existing webpage platforms offering products and/or services may have errors that go undetected. For example, there may be errors in the way a webpage is displayed, the length of time a webpage takes to load, issues with navigating the platform, issues related to payment options on the webpage, and so forth. Even in situations where such errors may be detected, there is no indication of how significant the error may be. For example, certain errors may have a significant impact on revenue generation, or may lead to a negative user experience, which may, in turn, reduce traffic, and ultimately impact revenue generation.

If, however, a computing system could provide a secure and novel solution for increasing error detection and associate this with user activity and a potential loss of client resource (e.g., loss in revenue), then the efficiency of error correction could be increased, and result in a significant conservation of computing resources, as well as a significant increase in revenue.

Accordingly, features of the present disclosure can help to address these and other issues to provide an improvement to select technical fields.

More specifically, features of the present disclosure relates to methods and systems of comparing time-indexed data indicative of user activity and time-indexed data indicative of one or more anomalies at a client computing platform to determine a causal relationship, monitoring changes in probabilities that indicate that a user is likely to perform an action, and use the causal relationship to estimate loss of a client resource. Such detection and remediation, especially when tied directly to an actual amount of potential losses in revenue, can result in significant savings. These features will now be described.

Generally, software related errors may have a long tail, i.e., few software bugs may account for a majority of the issues or a majority of lost revenues. Therefore, it is a significant value proposition to identify for clients what the errors and/or issues are, and their relative impact in terms of revenue being lost. Sometimes, a particular issue may appear frequently, but may have a low impact on revenue. For example, an image can appear and disappear from the user interface but have a low impact on revenue. However, an issue with the payment page can have a high impact on revenue. For example, a customer may be ready to make a payment. However, the payment page may be malfunctioning. For example, the customer may be unable to access a saved payment method, the customer may be unable to update their payment information, a discount may not be applied, there may be an error in the shipping charges, the payment page may freeze up and become unresponsive. Such errors can dissuade the customers from finalizing their order, and in some cases, the customers may choose to abandon their purchase. Accordingly, such errors can result in a substantial, measurable impact on revenue. Accordingly, in some embodiments, the errors may be ranked in terms of an impact on the revenue. Thus, issues that have a higher potential for a loss in revenue can be prioritized for resolution.

Embodiments of the present invention provide methods, systems, and devices that allow a system to effectively analyze user data, streamline the identification and correction of significant errors in an operation of a platform, thereby resulting in a significant improvement in user experience.

For example, the disclosed embodiments disclose, among other features, an improved platform that leverages the security, transparency, speed, and privacy of one or more digital technologies to enhance user experience in engaging with the products and services in which they are interested and may use to procure such products and services. In this regard, stakeholder on a diagnostics platform has access to real-time data and analytics that can be used to further personalize, enhance and enrich user experiences at a client platform. The techniques described are not limited to any particular industry, and are applicable to all platform types.

A computer-implemented method may include a computing system (e.g., a cloud-based computing system). This computing system can be used to perform various operational functions to analyze data associated with a user (e.g., associated with the click and/or purchasing behavior of a user) and take one or more responsive actions based on the data.

For example, an individual consumer at a client platform may exhibit purchasing habits, actions, and/or trends by one or more actions, one or more of which may be associated with different aspects in their everyday life. For example, an individual consumer may input data into a mobile computing device (e.g., a user of a smartphone) that indicates: (i) past purchasing habits for the user, (ii) potential purchases for the user, (iii) one or more payment options associated with the user, and (iv) geographic location data indicating a current location of a mobile computing device associated with the user, among other possibilities. Also, for example, data may be available with regards to a device used by the user, a type of browser, a type of secure algorithm, a virtual private network (VPN), network bandwidth, a preferred language, a preferred input mode (e.g., speech, text, etc.), among other possibilities.

In some embodiments, such data may be collected from a current user session, a current click behavior, current behavior and/or interactions of the user on and/or with the platform, etc. Additionally or alternatively, the data may be gathered and analyzed on a more collective level of multiple users (e.g., based on collecting and analyzing data from a host of consumers), multiple client platforms, and so forth.

It should be readily understood that the computing system may receive data associated with a user and/or client platform and may do so from a number of sources. For example, the computing system may receive user input indicating interest in purchasing a specific good or service (e.g., tickets to a specific sporting event) at the client platform. Other examples are possible.

Once the data is received, however, the computing system may generate a representation of this data. For example, the computing system may generate one or more entries based on the data. In some embodiments, the computing system may store these one or more entries in a persistently-stored structure (e.g., a distributed network). In some examples, the computing system may generate a time series based on this data. Other examples are possible.

The computing system may also analyze the data. For example, the computer system may compare data related to a performance at the client platform with data related to user activity at the client platform. In some embodiments, the computing system may generate a time series of probability distributions that captures user behavior. Comparison of the user activity, performance issues at the client platform, and the probability distributions can provide significant insights into aspects that impact user experience for a user, while also impacting revenues for the client platform.

Other example embodiments are also possible, many of which are discussed in further detail below.

II. Example Architecture

A. Computing Device

FIG. 1 is a simplified block diagram of an example computing device 100. The computing device 100 can be configured to perform and/or can perform one or more acts and/or functions, such as those described in this disclosure. The computing device 100 can include various components, such as a processor 102, a data storage unit 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions included in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define, and/or be part of, a discrete software application. In some instances, the computing device 100 can execute program instructions in response to receiving an input, such as an input received via the communication interface 106 and/or the user interface 108. The data storage unit 104 can also store other types of data, such as those types described in this disclosure.

The communication interface 106 can allow the computing device 100 to connect with and/or communicate with another entity according to one or more protocols. In one example, the communication interface 106 can be a wired interface, such as an Ethernet interface. In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, and/or a microphone, and/or output components such as a display device (which, for example, can be combined with a touch-sensitive panel), a sound speaker, and/or a haptic feedback system.

The computing device 100 can take various forms, such as a workstation terminal, a desktop computer, a laptop, a tablet, a mobile phone, and/or a mobile computing device.

B. Example Computing System

Figure 2:
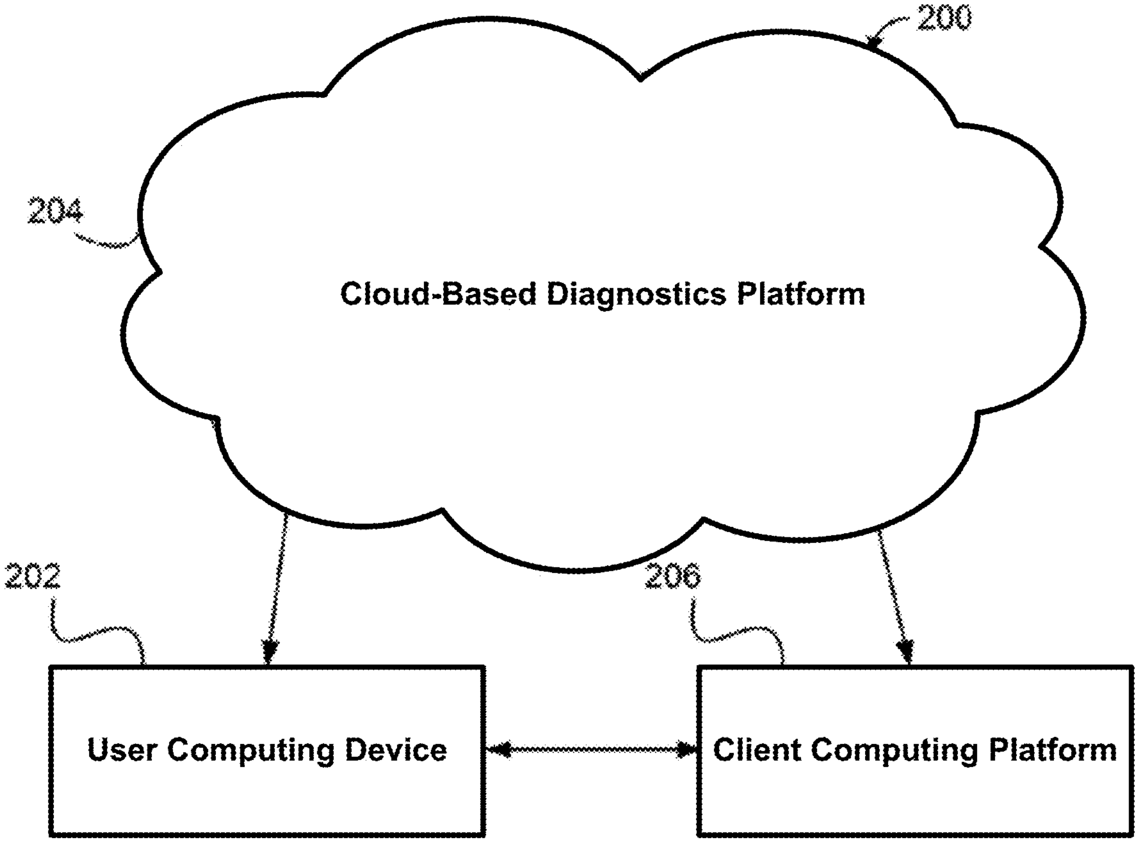
FIG. 2 is a simplified block diagram of an example computing system.

FIG. 2 is a simplified block diagram of an example computing system 200. The computing system 200 can perform various acts and/or functions related to the concepts detailed herein. In this disclosure, the term "computing system" means a system that includes at least one computing device. In some instances, a computing system can include one or more other computing systems, including one or more computing systems controlled by the service provider, a user, a client, different independent entities, and/or some combination thereof.

It should also be readily understood that computing device 100, computing system 200, and all of the components thereof, can be physical systems made up of physical devices, cloud-based systems made up of cloud-based devices that store program logic and/or data of cloud-based applications and/or services (e.g., perform at least one function of a software application or an application platform for computing systems and devices detailed herein), or some combination of the two.

In any event, the computing system 200 can include various components, such as user computing device 202, Cloud-based diagnostics platform 204, and client computing platform 206, each of which can be implemented as a computing system.

The computing system 200 can also include connection mechanisms (shown here as lines with arrows at each end (i.e., "double arrows"), which connect user computing device 202, Cloud-based diagnostics platform 204, and client computing platform 206, and may do so in a number of ways (e.g., a wired mechanism, wireless mechanisms and communication protocols, etc.).

In practice, the computing system 200 is likely to include many of some or all of the example components described above, such as user computing device 202, Cloud-based diagnostics platform 204, and client computing platform 206, which can allow many users to communicate and/or interact with the service provider and/or one or more clients, many clients to communicate and/or interact with the service provider and/or one or more users, and so on.

III. Example Operations

The computing system 200 and/or components thereof can perform various acts and/or functions (many of which are described above). Examples of these and related features will now be described in further detail.

Within computing system 200, a user associated with a user computing device 202 may interact with user computing device 202 and may do so in a number of ways. For example, the user computing device 202 may receive input from a user indicating interest in purchasing a specific good or service (e.g., tickets to a specific sporting event), GPS data associated with a geolocation of the user computing device 202 (and thereby the user), and/or other types of data associated with a user. In some examples, this data associated with a user may be inputted into a mobile application associated with the cloud-based diagnostics platform 204, where the mobile application is executed on user computing device 202.

Cloud-based diagnostics platform 204 may take one or more forms and/or include one or more components configured in a variety of ways. For example, cloud-based diagnostics platform 204 may include a computing node disposed within a distributed computing network. In a further aspect, this distributed computing network may include a plurality of computing nodes, which may perform a number of functions. For example, this plurality of nodes may maintain a distributed ledger.

In a further aspect, cloud-based diagnostics platform 204 may communicate with one or more other computing systems and/or computing devices (including user computing device 202 and/or client computing platform 206) and may perform any number of actions based on these communications.

For example, cloud-based diagnostics platform 204 may receive data associated with a user via user computing device 202 and take one or more actions based thereon. For example, as a user navigates client computing platform 206 using user computing device 202, cloud-based diagnostics platform 204 may receive, from client computing platform 206, a first plurality of time-indexed data packets indicative of user activity associated with the user (e.g., a clickstream, purchase activity, navigation activity, viewing activity, selection or deselection of products, and so forth). At the same time, cloud-based diagnostics platform 204 may receive, from client computing platform 206, a second plurality of time-indexed data packets indicative of one or more anomalies at the client computing platform 206.

In any event, once the cloud-based diagnostics platform 204 has received the first and second plurality of time-indexed data packets, cloud-based diagnostics platform 204 may compare the first and second plurality of time-indexed data packets to determine whether a particular anomaly caused a change in user intent of the user to perform a particular activity at the client computing platform. In some embodiments, the one or more entries may be one or more ledger entries based on the data. In some examples, based upon a determination that the particular anomaly caused the change in user intent, cloud-based diagnostics platform 204 may determine an estimated loss of a client resource at the client computing platform 206. In some examples, cloud-based diagnostics platform 204 may display, by a graphical user interface, a graphical representation of the particular anomaly and the estimated loss. Other examples are possible.

In any event, cloud-based diagnostics platform 204 may determine a relationship between the anomaly in performance at the client computing platform 206, and a change in user intent/behavior at the client computing platform 206, and attribute a loss in revenue based on the relationship.

IV. Example Computing Environment

Figure 3:
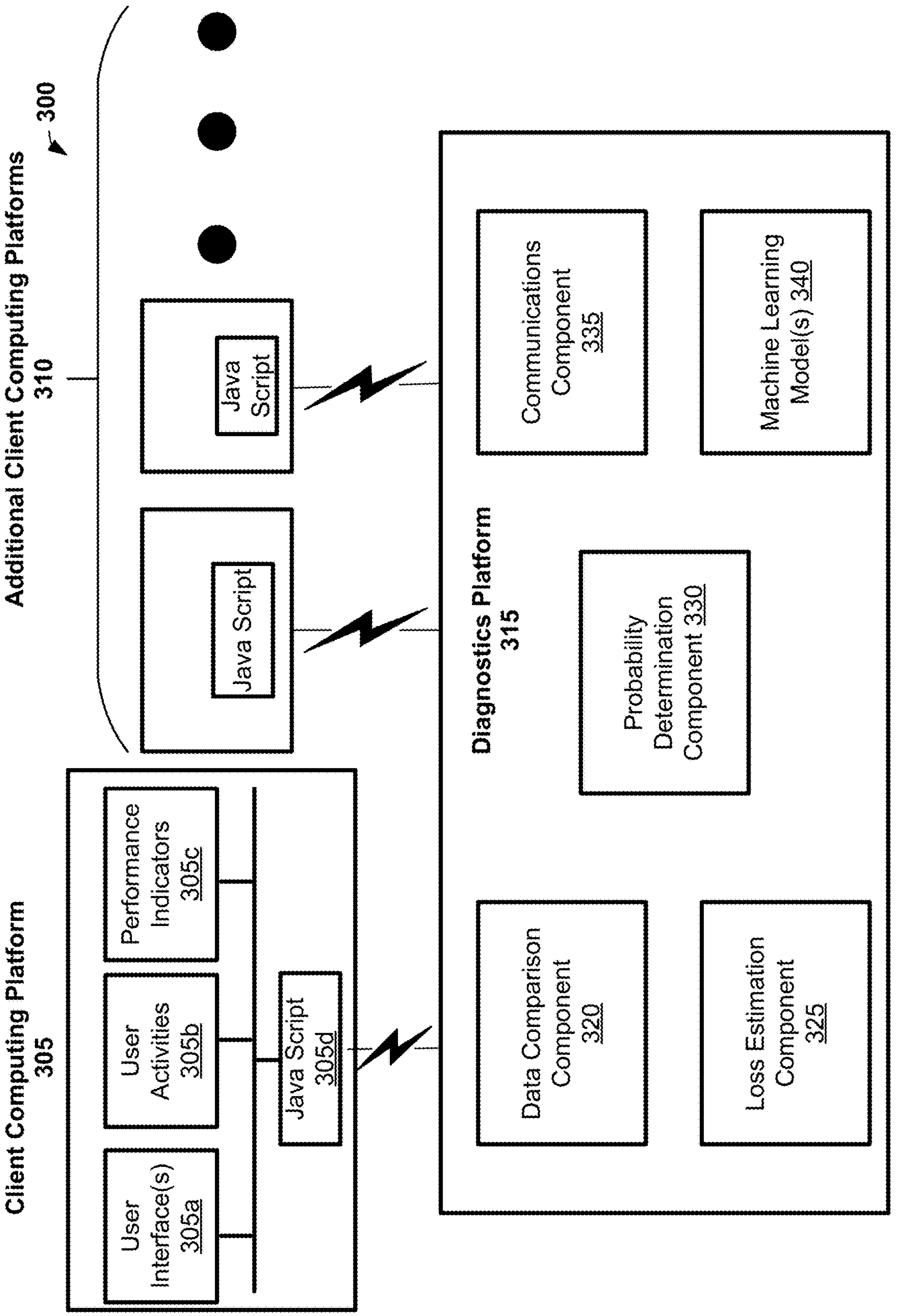
FIG. 3 is a simplified block diagram of an example computing environment.

FIG. 3 is a simplified block diagram of an example computing environment 300. Computing environment 300 can include client computing platform 305, a plurality of additional client computing platforms 310, each being communicatively linked to diagnostics platform 315.

In some aspects, client computing platform 305 can provide user interface(s) 305*a* that provide, to a user, various products, services, and features offered by client computing platform 305. For example, client computing platform 305 may be an electronic commerce platform specializing in clothing items. Accordingly, user interface(s) 305*a* can display images, prices, selectable options, etc. that enable a user to view an item, read reviews, select the item, add to a shopping cart, select a shipping method, a mode of payment, and so forth.

A number of user activities 305*b* can occur at the client computing platform 305. As the user navigates the various pages of the client computing platform 305, user activity related to viewing, selecting, deselecting, adding to the cart, searches, preferences (e.g., size, color, brand, and texture), payment preferences, and so forth can be captured. Also, user activities 305*b* can identify an origination (e.g., which website did the user come from, did they click on a coupon, did they select a link received in a promotion via text, email etc.). User activities 305*b* can identify a landing page for the user (e.g., did the user land directly at the payment page, did they land at the sales page, did they land at the home page, etc.).

In order to support the user interface(s) 305*a* and the user activities 305*b*, a number of computing resources may be deployed. Each aspect of user interaction with the client computing platform 305, and the computing infrastructure of the client computing platform 305 may be monitored for performance related issues. Performance indicators 305*c* can include a record of all performance aspects of the client computing platform 305.

In some aspects, a scripting program, such as a JAVA® script (Java script) 305*d* may be run on the client computing platform 305 to collect data from the user interface(s) 305*a*, user activities 305*b*, and performance indicators 305*c*. For example, the Java script may be configured to crawl the client computing platform 305 to collect the data. Subsequent to the collection, the data may be transmitted, via a communication link, to the diagnostics platform 315. In some embodiments, some of the collected data may be transmitted in real-time, and some data may be transmitted in batches. In some embodiments, client computing platform 305 may prompt Java script 305*d* and cause it to collect and transmit certain types of data.

At a high level, Java script 305*d* can be integrated into the client computing platform 305 (e.g., online store). The Java script 305*d* can be a front end integration. Upon integration, Java script 305*d* can start collecting the user data or the clickstream. This enables diagnostics platform 315 to extract as much information as possible from the user in terms of what the user clicks, what they do, and at the same time, collect or track the software bugs. Thus, the same Java script 305*d* collects user behavior (e.g., click stream) and also the software bugs, and the time-indexed data indicates when the software bug occurred. Diagnostics platform 315 identifies users with similar behavior (e.g., context and completion probabilities), and the users were at the same timestamp, and/or same position, or the same context. However, one user received an error, and another did not. This way, a loss in revenue may be objectively determined.

For example, images may be corrupted, or may be large in size and fail to upload properly. This may cause a user to not proceed to purchase an item (e.g., they are less likely to purchase an item if they cannot view the images associated with the item). As another example, Diagnostics platform 315 may include one or more components, such as, for example, data comparison component 320, loss estimation component 325, probability determination component 330, communications component 335, and/or machine learning model(s) 340.

Data comparison component 320 can be configured to receive, from the client computing platform 305, a first plurality of time-indexed data packets indicative of user activity associated with a user of the client computing platform 305. For example, Java script 305*d* may transmit user activities 305*b* to the diagnostics platform 315. Data comparison component 320 can also be configured to receive, from the client computing platform 305, a second plurality of time-indexed data packets indicative of one or more anomalies at the client computing platform 305. For example, Java script 305*d* may transmit performance indicators 305*c* to the diagnostics platform 315. Data comparison component 320 can also be configured to compare the first and second plurality of time-indexed data packets to determine whether a particular anomaly caused a change in user intent of the user to perform a particular activity at the client computing platform 305.

In some embodiments, data comparison component 320 can be configured to receive, from the client computing platform 305, a third plurality of time-indexed data packets indicative of second user activity associated with a second user of the client computing platform. Generally speaking, data comparison component 320 will likely receive data regarding multiple users at any given time. Data from multiple users can allow data comparison component 320 to monitor traffic, and analyze user behavior. For example, several users may have had difficulty in uploading a particular image. This may indicate that the image size and/or resolution is high, that network bandwidth is limited, that certain browsers are unable to upload the image, and so forth. Analyzing user behavior as it relates to a particular activity (e.g., viewing an image, adding an item to a cart, making a payment, etc.) at a particular time, can provide insights into performance aspects of the client computing platform 305.

In some embodiments, loss estimation component 325 can be configured to determine an estimated loss of a client resource at the client computing platform 305. In some examples, the client resource can include potential revenue to be generated at the client computing platform 305 based on the particular activity. In some examples, the client resource can include time spent by the user at the client computing platform 305, a number of visits to the client computing platform 305, a computational resource of the client computing platform 305.

Generally speaking, although one or more anomalies may be detected, there is no clear relationship between a particular anomaly and an amount of loss in revenue caused by the particular anomaly. For example, certain users may navigate away from a page displaying an item, instead of adding the item to the shopping cart. However, other users may have added the item to their respective shopping carts and completed the purchase. Accordingly, loss estimation component 325 can be configured to objectively determine such losses and attribute them to specific user activity and/or anomaly. Anomalies associated with higher losses in revenue may then be prioritized for a speedy resolution. Generally speaking, when there is no direct relationship between a specific user activity and/or anomaly and a negative impact on revenue, such relationships may be determined based on a comparison of similar visits/activities by the same or other users, patterns of user behavior based on items, platforms, seasons, and so forth. In some embodiments, a machine learning model can be deployed to detect such patterns, and predict relationships between a user activity and/or anomaly and a revenue loss.

The one or more anomalies can include a functional error, a communication error, a missing command error, a syntactic error, an operational error, a control flow error, or a mathematical error. Other anomalies are possible. Generally, a software product is configured to function in a certain manner. The term "functional error" as used herein may generally refer to any deviations from such expected functionality. In order to provide customer service, the client computing platform 305 may be configured to provide various messages, prompts, pop-ups, labels, etc. The term "communication error" as used herein may generally refer to any error in providing such communications to the user.

The client computing platform 305 may also include various navigation buttons, and selectable icons that enable a user to perform operations such as add, cancel, select, go back, move forward, pay, etc. The term "missing command error" as used herein may generally refer to any missing and/or disabled commands that interfere with a user's ability to effectively navigate and/or perform actions at the client computing platform 305. The one or more anomalies can include a syntactic error such as a spelling error, a grammatical mistake, etc. Although such errors may appear harmless in general, they may cause significant impediments to a positive user experience, and/or impede revenue generation. For example, a misspelling in a name of a brand may deter a user from purchasing an item.

The term "operational error" as used herein may generally refer to errors in properly directing a user with error messages. For example, providing an incorrect error message to the user may cause the user to navigate away from a page, and not purchase an item. Also, for example, an incomplete error message, or an error message that fails to convey to a user the precise nature of the error, can cause the user to get frustrated, and possibly leave the client computing platform 305 (and perhaps visit a competitor's platform).

Software programs are designed to flow logically from one state to another. A "control flow error" generally refers to any error in a flow of the software program. For example, after a user adds an item to the shopping cart and indicates a desire to purchase the item, the control flow should take the user to the shipping page to prompt the user to enter shipping information, or verify the saved information. Once the user completes the task, the control flow may be configured to navigate the user to the payment page. However, a control flow error may cause the shipping information to not be saved, causing a disruption in the payment process. A user may then navigate away from making the payment, or leave the client computing platform 305.

Likewise, mathematical errors can cause significant losses in revenue. For example, errors in prices, discount percentages, shipping dates, calculation of shipping costs, taxes, or errors in total amounts, can significantly disrupt user experience. These can also cause increased customer complaints, additional resources to address such complaints, and in some instances, issuing refunds, replacements, and so forth. Such errors can add up and potentially cause a significant loss in revenue, and expenses in terms of computing resources and manpower.

Figure 8:
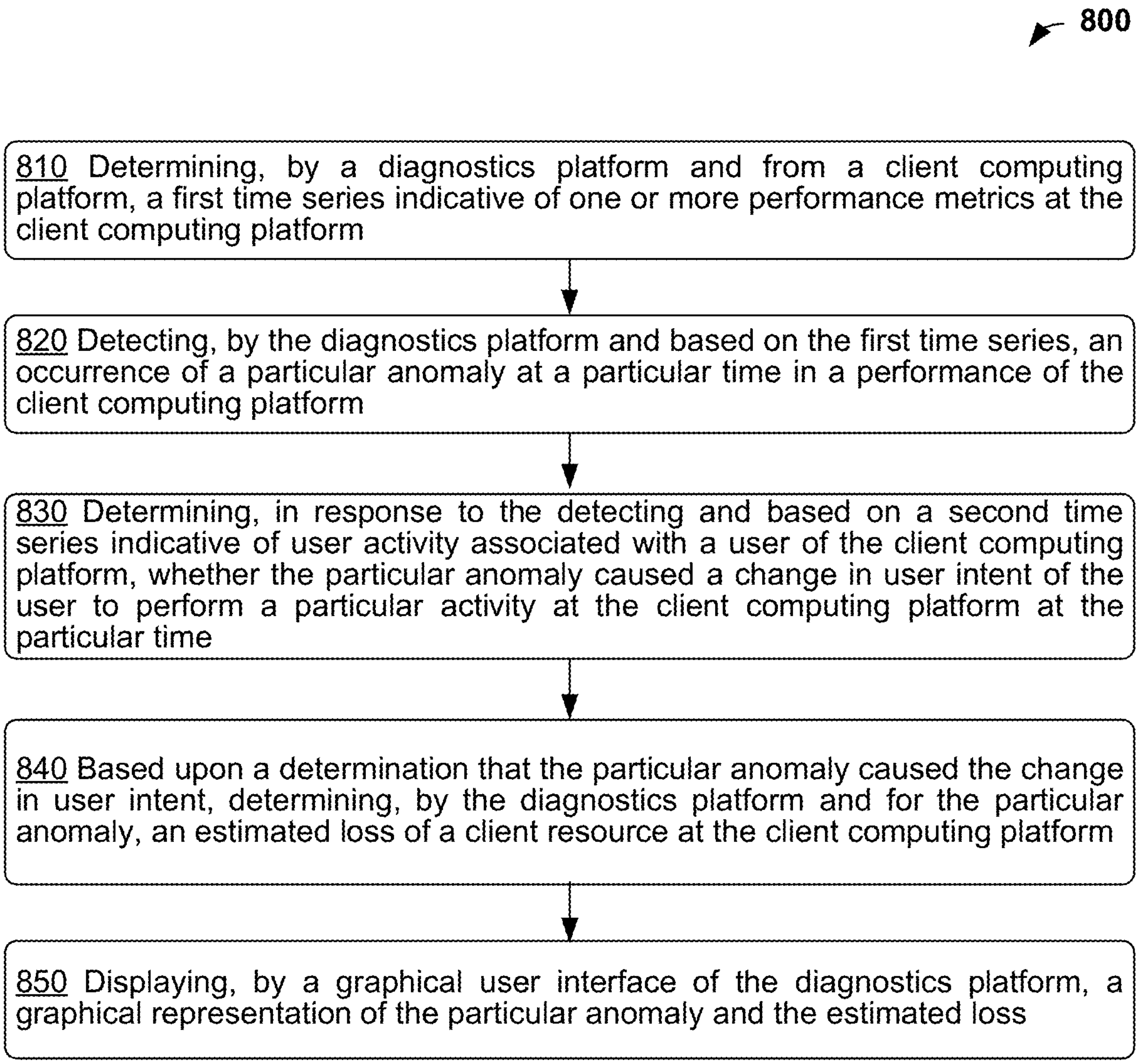
FIG. 8 is another flow chart of an example method.

In some embodiments, probability determination component 325 can be configured to determine a time-indexed context associated with the user. The time-indexed context can be indicative of a plurality of parameters related to user experience of the user at the client computing platform 305. FIG. 8 illustrates some of the parameters related to user experience. Additional parameters are possible. In some embodiments, as many as 60-70 parameters may be collected.

For example, Android users may purchase less than iOS users, and/or desktop users may purchase more than mobile users. The parameters may include a version of a device used by the user, its operating system (e.g., is it an updated version or an older version), which products did the user view, so that the actual prices may be obtained, the product categories, how many times a user scroll up or down on a single page, how many other similar products has the user viewed, and/or purchased in the past, specific times when the user simply navigates versus times when the user actively makes purchases, and so forth. Generally speaking, the user context can evolve over time. This can depend on a number of user clicks, an amount of time spent browsing, and so on. The context can also depend on a type of product. For example, the context for browsing a car may be different from a context for browsing clothes, jewelry, and so forth.

The context can take into account where the user came from (e.g., from a social media platform, or a news website, a job placement website, a healthcare platform, did they click on an advertisement, or scan/add/click on a coupon, etc.). The context may be based on the landing page on the client computing platform 305.

In some embodiments, probability determination component 325 can be configured to predict, for a given time, an activity completion probability for the user. The activity completion probability can indicate a likelihood that the user will perform the particular activity. For example, the activity completion probability can indicate a probability that the user will view an item, add it to a shopping cart, and/or purchase the item. Generally, the activity completion probability may increase with every click. For example, the activity completion probability to complete a purchase may be low when the user is browsing. The activity completion probability may increase when the user adds an item to the shopping cart. The activity completion probability may increase further when the user visits the shopping cart. Generally, the more the user clicks and the more actions the user takes, the activity completion probability of making a purchase increases.

In some embodiments, probability determination component 325 can be configured to determine a relative activity completion probability for the user, where the relative activity completion probability indicates a likelihood that the user will perform the particular activity based on a determination that the second user performed the particular activity. For example, if several users have navigated to the shopping cart after purchasing an item at 50% off (e.g., during a holiday season), there is a higher probability that another user may mimic that behavior. For example, when several users have selected a product on sale and have navigated to the cart, and subsequently completed a purchase of that product, there is a higher probability that another user, after selecting that product (or a similar product on sale), and having navigated to the cart, will complete purchasing the product or the similar product. Other examples are possible.

For example, for two users A and B, both users may exhibit similar behavior at each timestamp (in their respective time-indexed data). Accordingly, their respective activity completion probabilities may be similar. If user A purchases an item, probability determination component 325 may assign a high relative activity completion probability for user B. On the other hand, if user A does not purchase the item, probability determination component 325 may assign a low relative activity completion probability for user B. In general, the relative activity completion probability may be a component of the activity completion probability for a user. For example, the activity completion probability may be calculated as a sum of conditional relative activity completion probabilities.

For example, both users A and B may add the same pair of jeans to the shopping cart, for example, for $50. The users may then visit a page with a T-shirt marked at $20.00. User A may visit the shopping cart and complete the purchase, for a revenue of approximately $70. However, the jeans and T-shirt purchase page may not work for user B. As a result, user B may buy some cheese for $15 instead. Users A and B have the same context and similar activity completion probabilities, and it may be inferred that the error at the jeans and T-shirt purchase page caused an objective loss in revenue in the amount of nearly $55. The term "caused" used herein refers to a causation principle whereby variables or features of one time series can predict the outcome of another time series. For example, behaviors of thousands of users may be analyzed, and users with similar contexts and/or similar activity completion probabilities can be grouped together. Accordingly, when users A and B are in the same group, their respective time series can be analyzed to predict behaviors about one another. In some embodiments, a machine learning model can be trained to analyze data related to the behaviors of thousands of users, and classification algorithms can detect different groups of users. Users in the same group can then be associated with similar behaviors, and an actual activity by one user in the group can then be used to predict an activity by another user in the same group.

The probability determination component 325 can also be configured to predict a likely impact on revenue based on types of changes to the client computing platform 305. For example, when a software is deployed in the production environment, there may be millions of visitors per month with annual revenues nearing 100 million dollars in US currency. A seemingly small error that goes unidentified in one day can result in millions of dollars in lost revenues. Accordingly, an ability to predict revenue impact for different types of changes in the debugging, testing, and/or developing environment can have significant consequences. Also, for example, when user B fails to purchase the product, there is a significant drop in the activity completion probability. In some embodiments, a drop in the activity completion probability that is larger than a threshold amount may trigger a notification, and/or cause the diagnostics platform 315 to perform additional analysis of the bugging data, and/or prompt the Java script **305*d* to collect additional data from client computing platform 305**.

The communications component 335 can be configured to display various graphical representations of various parameters via graphical user interfaces, and/or send error notifications. The communications component 335 can be configured to display the ranked plurality of anomalies. In some aspects, the communications component 335 can be configured to generate an error report identifying the particular anomaly and the estimated loss, and provide the error report to a software developer for debugging purposes.

Machine learning model(s) 340 may be trained to perform one or more of the operations described herein. For example, machine learning model(s) 340 may be trained to perform the predicting of the activity completion probability, to predict the user contexts, to predict one or more aspects of user behavior, predict a revenue impact from one or more software update processes, and so forth. For example, the machine learning model(s) 340 may generate a predictive model, such as based on a context time series for a user, indicating what a user likely will or will not purchase. In parallel, using the debugging data for comparison, the machine learning model(s) 340 may predict the software anomalies causing changes in user intent (as measured by a change in activity completion probabilities). By combining such predictions, the machine learning model(s) 340 may objectively predict revenue losses.

In some examples, the machine learning model(s) 340 may use the debugging timeline to identify when a bug occurred, and use that time to determine if there was a significant change in user intent (as measured by a change in activity completion probabilities) based on the predictive modeling of the activity completion probabilities. Finding such relationships and then comparing these relationships to the predictive modeling of the activity completion probabilities for other users, can enable the machine learning model(s) 340 to objectively determine losses in revenue. In some embodiments, the time series layers may be combined using a Long short-term memory (LSTM), and/or transformer architectures.

Machine learning model(s) 340 can include a training phase and a prediction phase. Generally, machine learning models 340 are trained during the training phase by using training data. In some embodiments, machine learning models may be trained by utilizing one or more machine learning algorithms that are applied to the training data to recognize patterns and output the prediction.

Machine learning algorithms can include artificial neural networks (e.g., convolutional neural networks, recurrent neural networks, a Bayesian network, a hidden Markov model, a Markov decision process, a logistic regression function, a support vector machine, a statistical machine learning algorithm, and/or a heuristic machine learning system). For example, the classification algorithms used herein may include one or more of support vector machines, K-nearest neighbors algorithms, Logistic regression, random forest algorithms, binary classification, multiclass classification, K-means clustering, linear classifiers, non-linear classifiers, multi-label classification, sentiment classifier, Naive Bayesian classifier, Decision Trees, and so forth. Machine learning algorithms may involve supervised, unsupervised, semi-supervised, and/or reinforcement learning techniques.

Generally, one or more components diagnostics platform 315 can be available as a platform, as an application programming interface (API), an application-specific integrated circuit (ASIC), as a service (e.g., Software as a Service (SaaS), Machine Learning as a Service (MLaaS), Analytics as a Service (AnaaS), Platform as a Service (PaaS), Knowledge as a Service (KaaS), and so forth.

V. Example Graphical User Interfaces

For example, to further illustrate the above-described concepts and others, FIGS. 4A-4D, and 6A-6F depict example graphical representations displayed via graphical user interfaces, in accordance with example embodiments.

The information displayed by the graphical user interfaces may also be derived, at least in part, from data stored and processed by the components described in connection with the cloud-based diagnostics platform 204, and/or other computing devices or systems configured to generate such a graphical representation displayed via graphical user interfaces and/or receive input from one or more users (e.g., those described in connection with computing system 200, as well as the components of FIGS. 1, 2 and/or 3). In other words, this graphical representation displayed via graphical user interface is merely for the purpose of illustration. The features described herein may involve graphical representations displayed via graphical user interfaces that format information differently, include more or less information, include different types of information, and relate to one another in different ways.

Turning to FIGS. 4A-4D, FIG. 4A is an example graphical representation displayed via graphical user interface ("GUI") in a first state. Interface 400 includes visual representations displayed by cloud-based diagnostics platform 204. Interface 400 presents the user with visual indications of several components of the methods and systems described herein and actions that may be taken in response thereto.

Figure 4A:
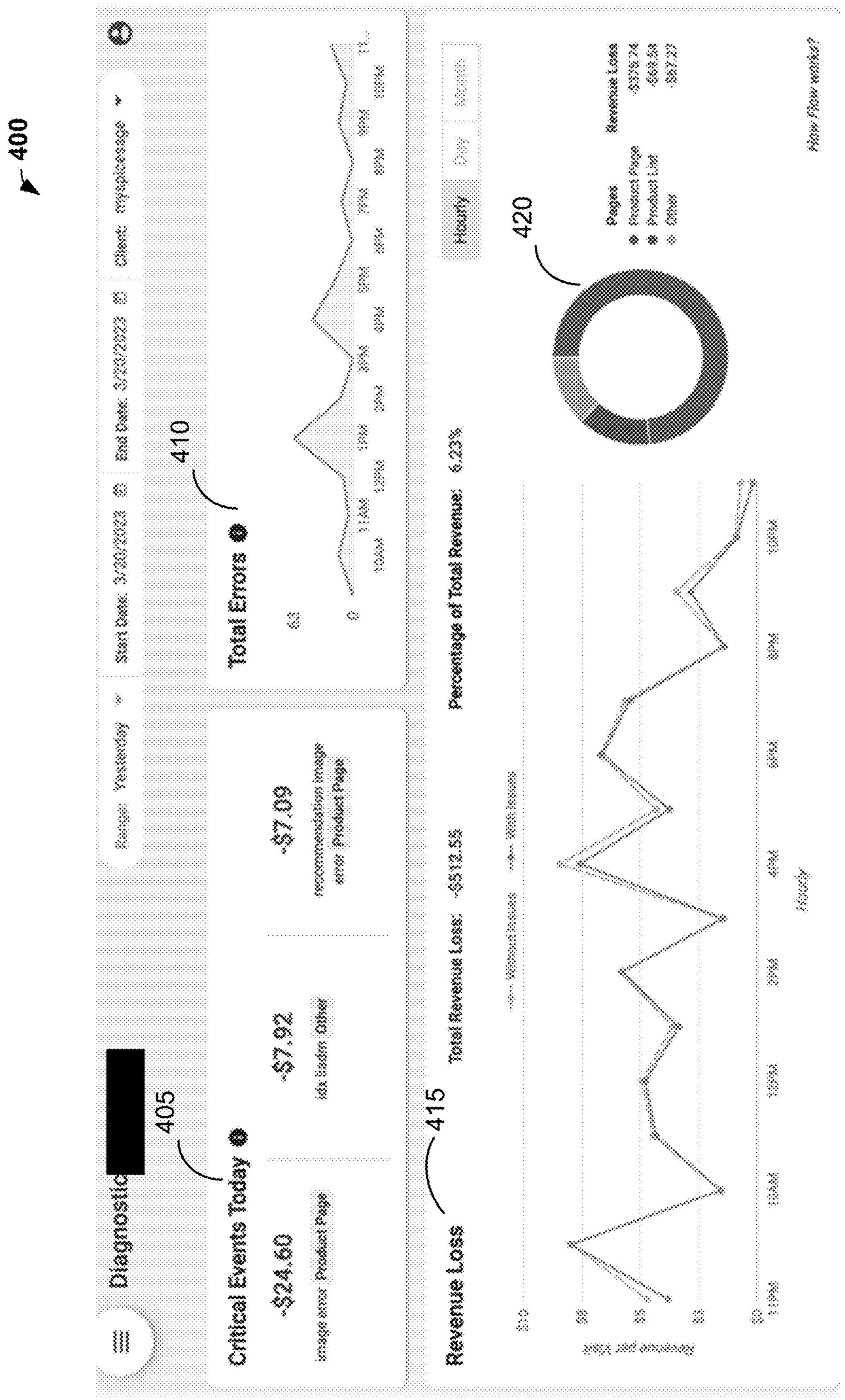
FIG. 4A is an example graphical user interface ("GUI") in a first state.

Specifically, in the context of FIG. 4A, these visual indications include information concerning diagnostic results. For example, critical events 405 during a given time period (e.g., day) are shown (e.g., image error or product page) resulting in a lost revenue of $24.60. A total number of errors 410 is displayed as time series data during a period from 10 AM to 10 PM. Revenue loss 415 is represented for a 24-hour time period from 11 PM to 10 PM. Two graphs are displayed together. A first graph illustrating revenue loss due to an anomaly, and the second graph displaying revenue loss without an anomaly. A pie chart 420 summarizes the revenue loss based on pages on the client platform (e.g., the product page corresponds to a $375.74 loss, etc.).

Figure 4B:
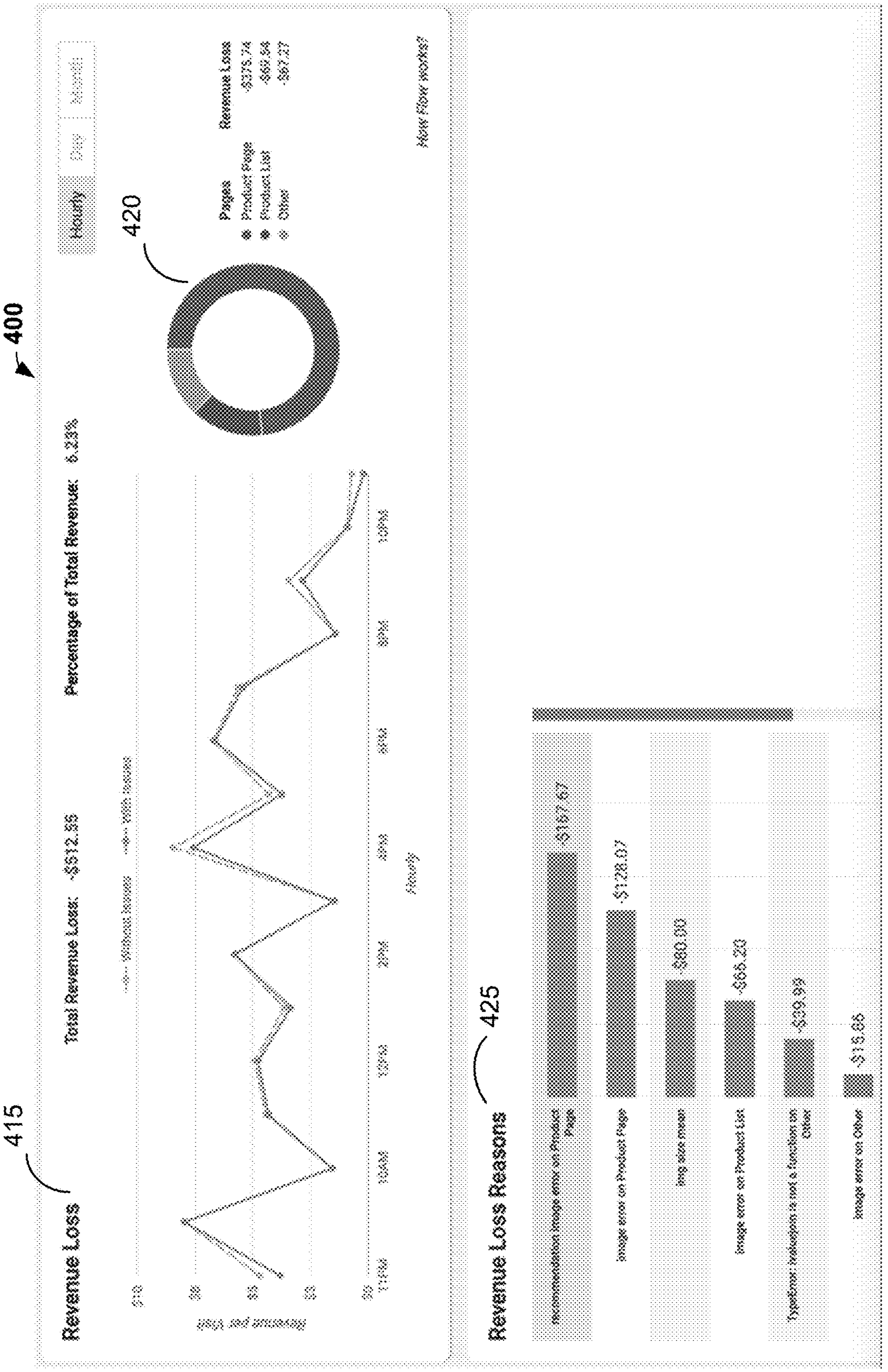
FIG. 4B is the example GUI of FIG. 4A, but in a second state.

For example, similar to FIG. 4A, FIG. 4B shows the graphical representations displayed via graphical user interface 400 of FIG. 4A, but in a second state. In the second state, Interface 400 displays revenue loss 415 represented for a 24-hour time period from 11 PM to 10 PM. Two graphs are displayed together. A first graph illustrating revenue loss due to an anomaly, and the second graph displaying revenue loss without an anomaly. A pie chart 420 summarizes the revenue loss based on pages on the client platform (e.g., the product page corresponds to a $375.74 loss, etc.). Additionally, Interface 400 displays revenue loss reasons 425 as a bar chart. For example, a recommendation image error on the product page resulted in a revenue loss of $167.67, an image size mean resulted in a loss of $80.00, and so forth.

Figure 4C:
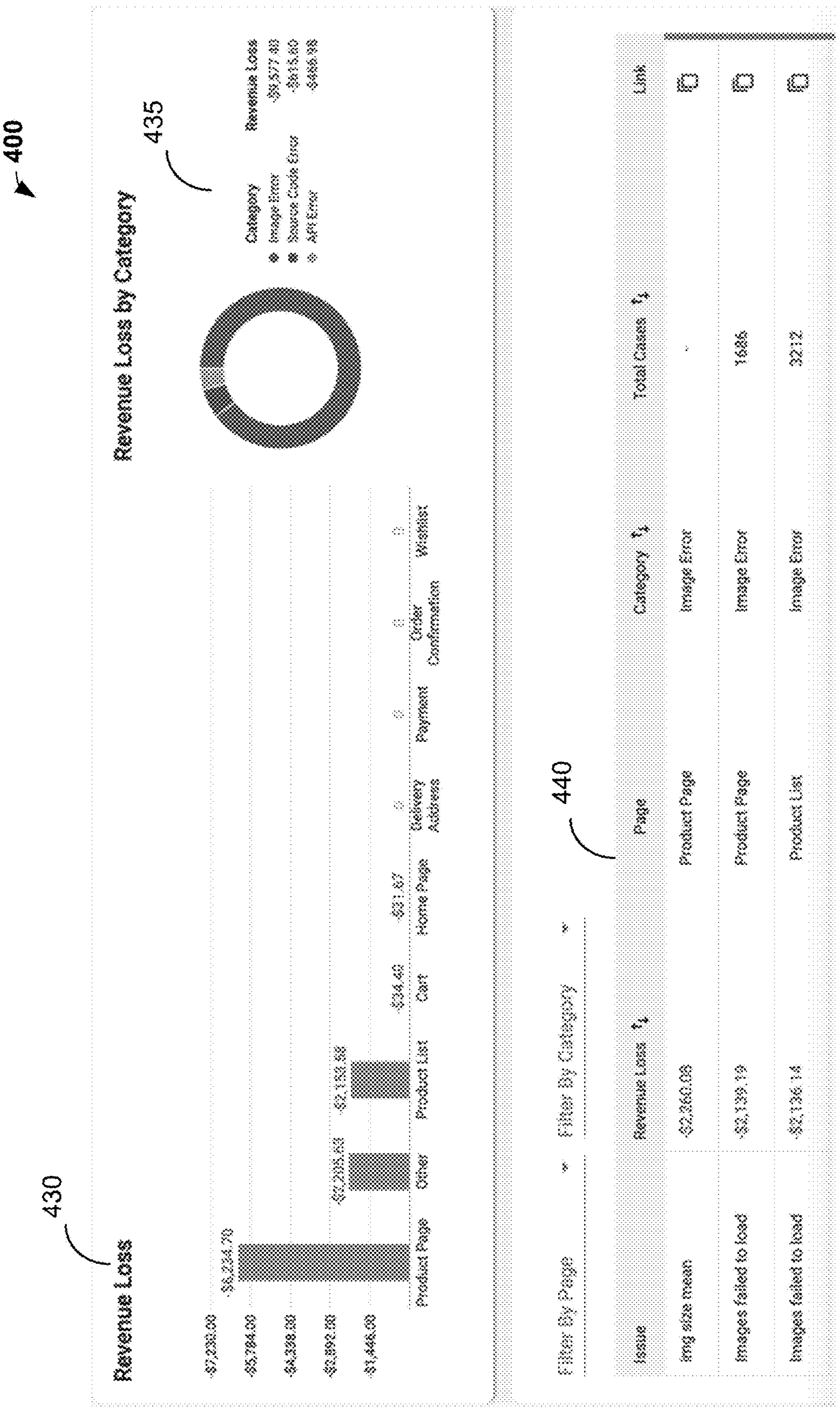
FIG. 4C is the example GUI of FIGS. 4A, but in a third state.

Turning to FIG. 4C, similar to FIGS. 4A-B, FIG. 4C shows the graphical representations displayed via graphical user interface 400 of FIG. 4A-B, but in a third state. In the third state, Interface 400 displays revenue loss 430 as a bar graph, revenue loss by category 435 as a pie chart. Interface 400 also displays a table 440 that can be filtered by page, by category. For each issue, (e.g., image size mean), a revenue loss (e.g., $2260.08) is displayed, the corresponding page where the issue occurred (e.g., product page) is shown, a category of error (e.g., image error) is shown, and a total number of detected cases is displayed.

Figure 4D:
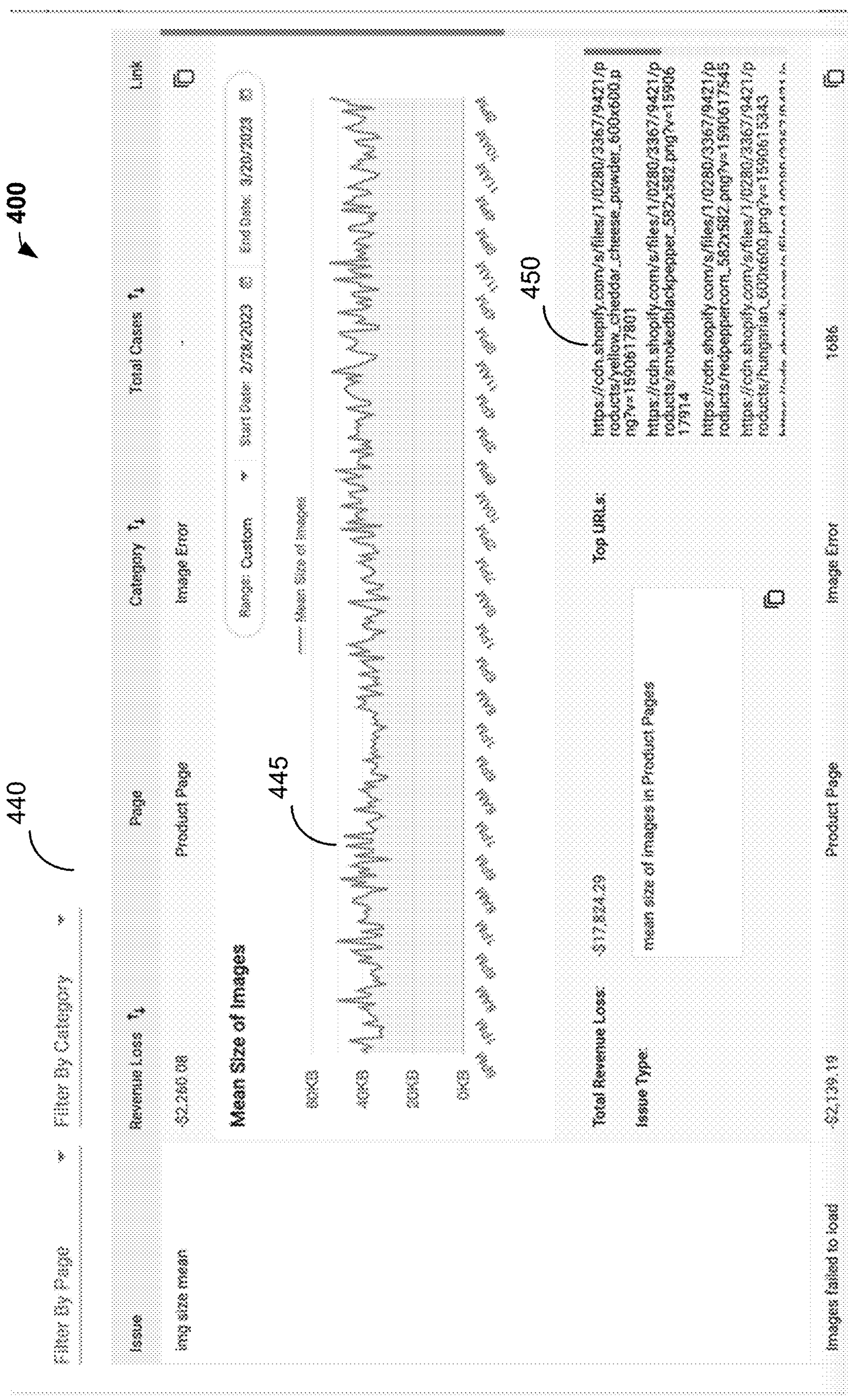
FIG. 4D is the example GUI of FIG. 4A, but in a fourth state.

Turning to FIG. 4D, similar to FIGS. 4A-C, FIG. 4D shows the graphical representations displayed via graphical user interface 400 of FIGS. 4A-C, but in a fourth state that results from a user selecting the first row in table 440 of FIG. 4C. In response, as illustrated in FIG. 4D, an expanded view of the first row is displayed. For example, time series 445 illustrates a mean size of images over time. List 450 displays the top URLs that correspond to the image size error.

FIG. 5 is a list of variables and their associated description.

Turning to FIGS. 6A-6F, FIG. 6A is an example graphical representation displayed via graphical user interface ("GUI") in a first state. Interface 600 includes visual representations displayed by cloud-based diagnostics platform 204. Interface 600 presents the user with visual indications of several components of the methods and systems described herein and actions that may be taken in response thereto.

Figure 6A:
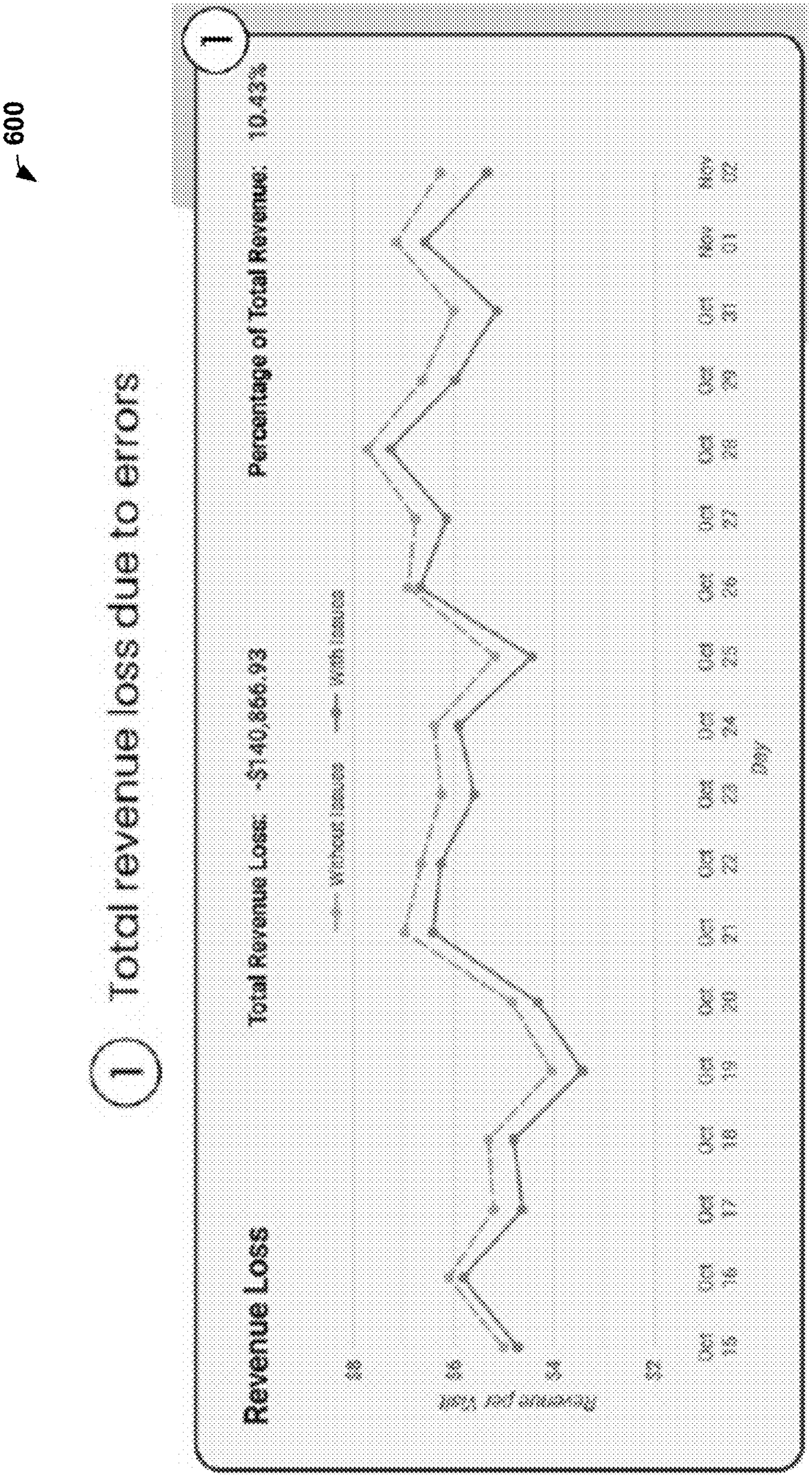
FIG. 6A is an example graphical user interface ("GUI") in a first state.

Specifically, in the context of FIG. 6A, these visual indications include information concerning diagnostic results. For example, Interface 600 displays a graph illustrating total revenue loss due to errors over a period from October 15 to November 2. The vertical axis represents revenue per visit. Two graphs are displayed together. A first graph illustrating revenue loss due to an anomaly, and the second graph displaying revenue loss without an anomaly.

Figure 6B:
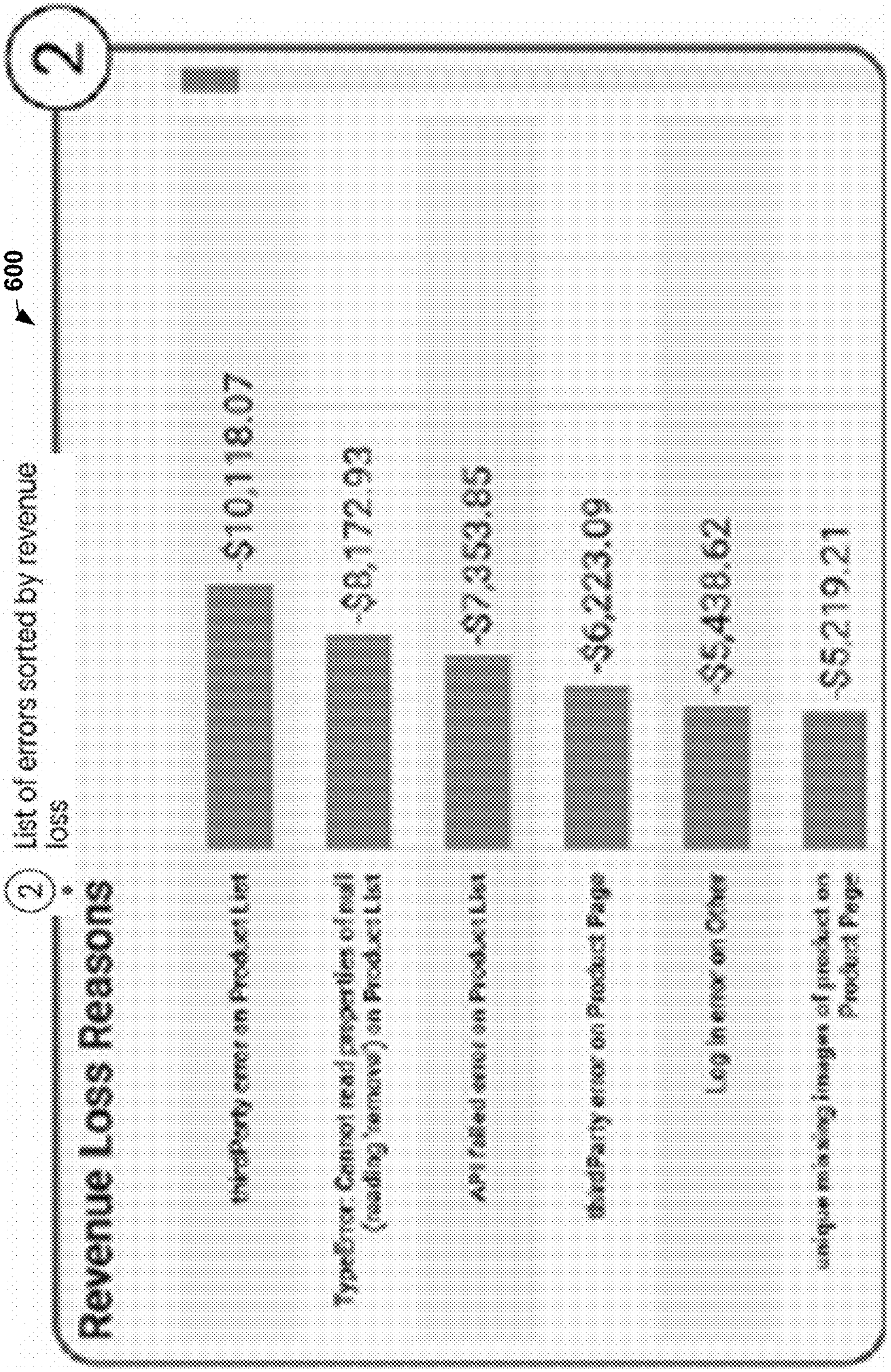
FIG. 6B is the example GUI of FIG. 8A, but in a second state.

For example, similar to FIG. 6A, FIG. 6B shows the graphical representations displayed via graphical user interface 600 of FIG. 6A, but in a second state. In the second state, Interface 600 displays a list of errors sorted by revenue loss.

Figure 6C:
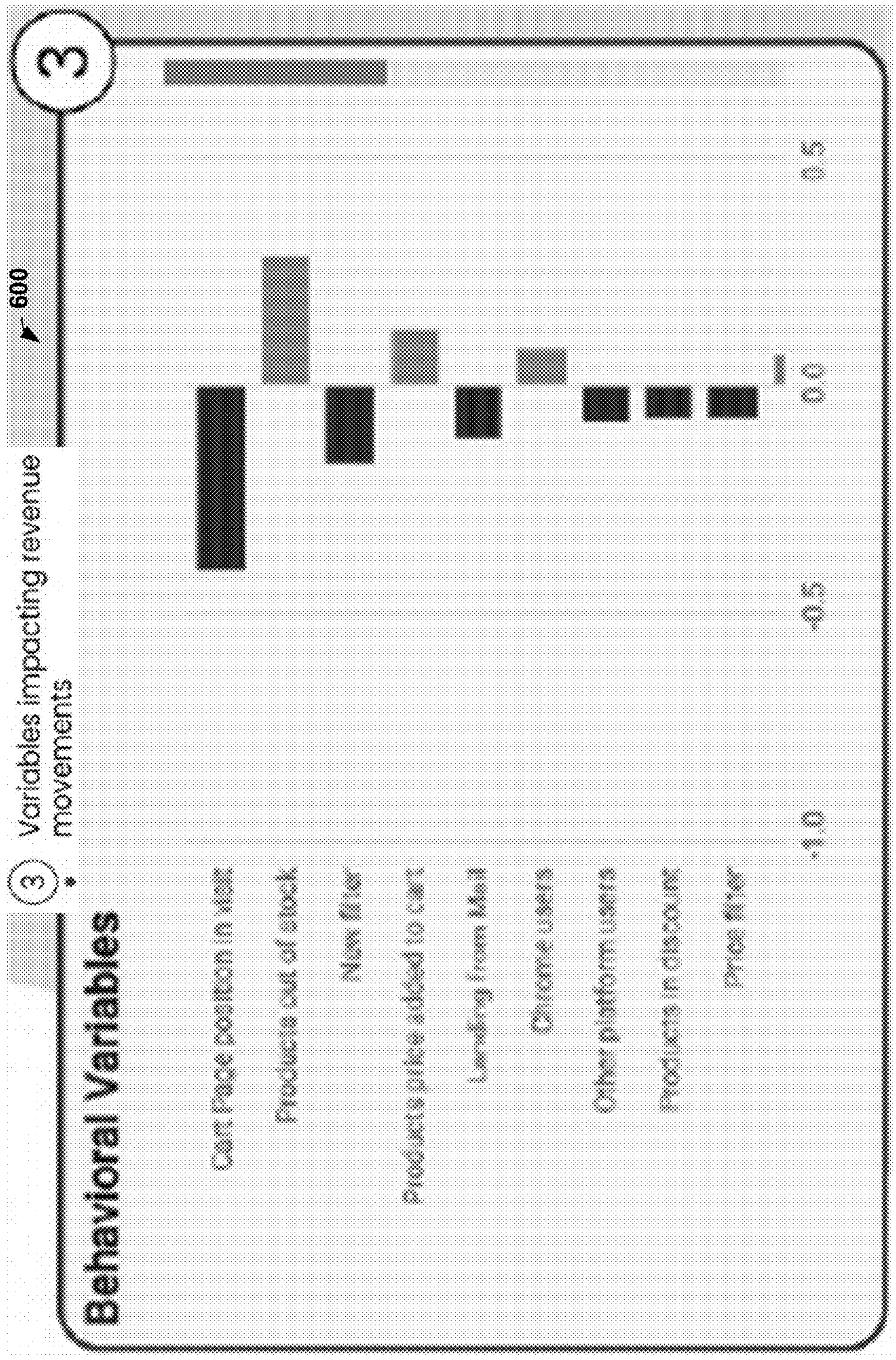
FIG. 6C is the example GUI of FIGS. 8A, but in a third state.

Turning to FIG. 6C, similar to FIGS. 6A-B, FIG. 6C shows the graphical representations displayed via graphical user interface 600 of FIG. 6A-B, but in a third state. In the third state, Interface 600 displays variable impacting revenue movements. For example, a number of behavioral variables are listed with corresponding revenues. The red bars indicate loss in revenue, and the blue bars represent gain in revenue.

Figure 6D:
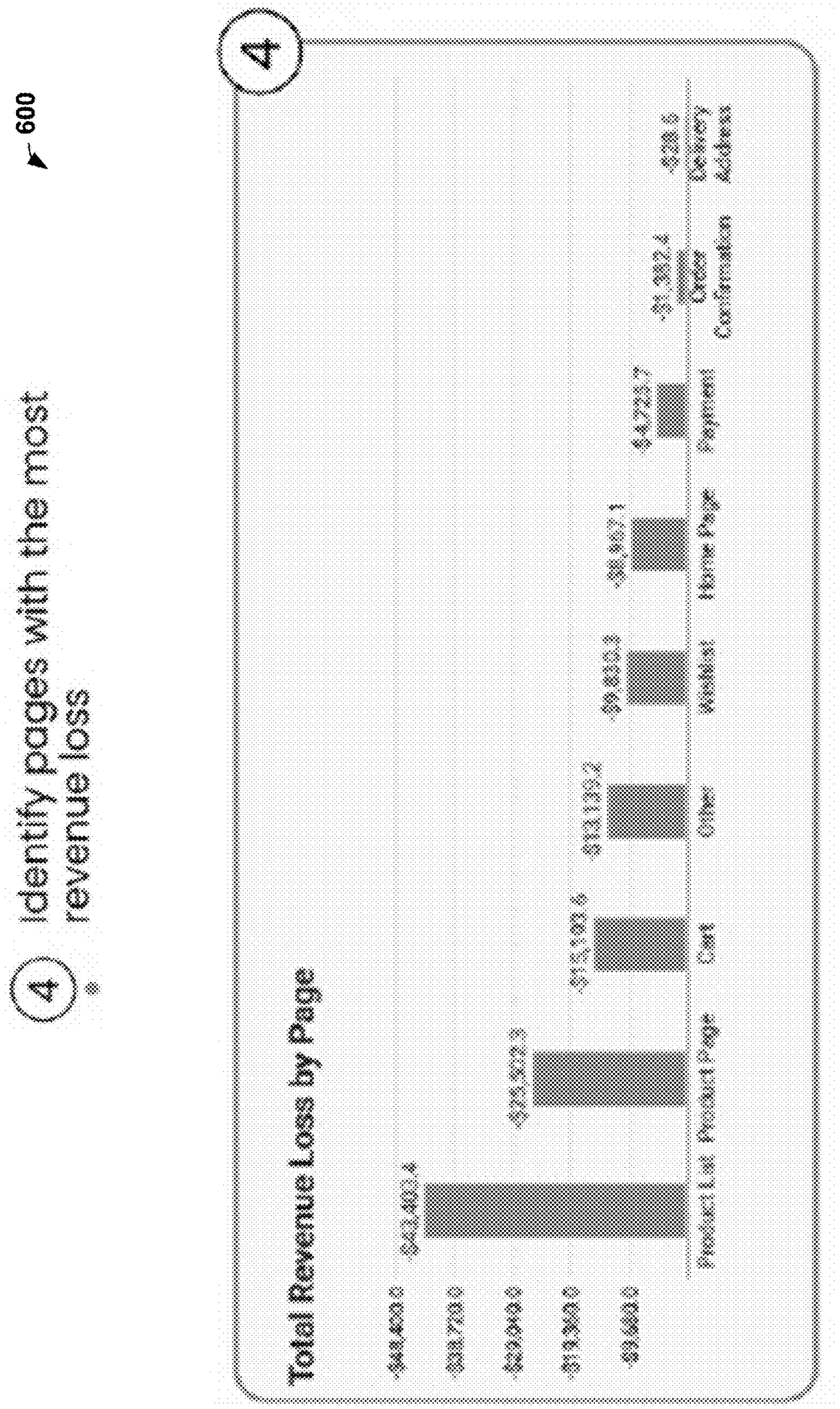
FIG. 6D is the example GUI of FIG. 8A, but in a fourth state.

Turning to FIG. 6D, similar to FIGS. 6A-C, FIG. 6D shows the graphical representations displayed via graphical user interface 600 of FIGS. 6A-C, but in a fourth state. In the fourth state, Interface 600 displays total revenue loss by page. The pages may be a product page, a cart, a home page, an order confirmation page, and so forth.

Figure 6E:
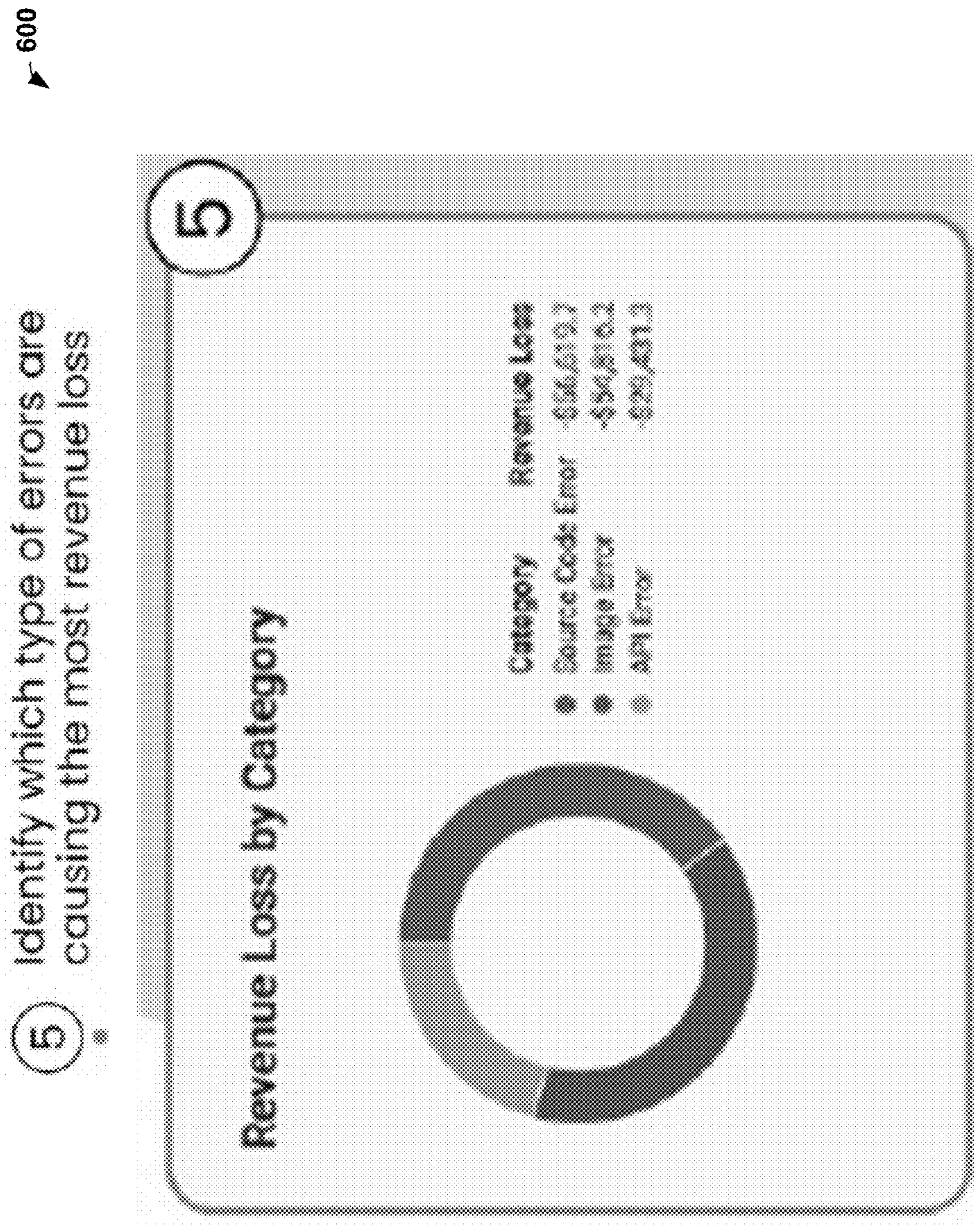
FIG. 6E is the example GUI of FIG. 8A, but in a fifth state.

Turning to FIG. 6E, similar to FIGS. 6A-D, FIG. 6E shows the graphical representations displayed via graphical user interface 600 of FIGS. 6A-D, but in a fifth state. In the fifth state, Interface 600 displays total revenue loss by category. For example, the categories may include a source code error, an image error, an API error, and so forth.

Figure 6F:
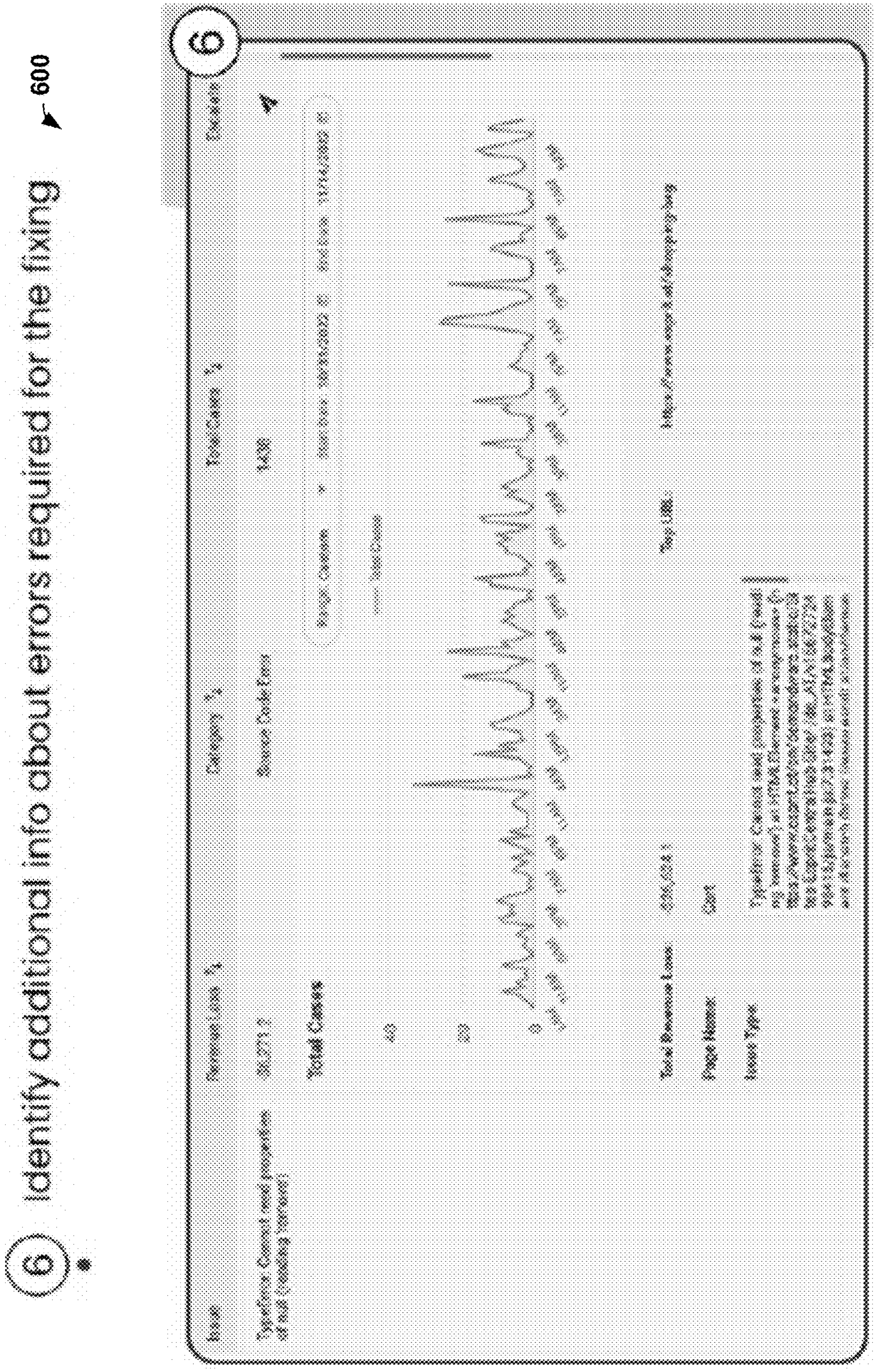
FIG. 6F is the example GUI of FIG. 8A, but in a sixth state.

Turning to FIG. 6F, similar to FIGS. 6A-E, FIG. 6F shows the graphical representations displayed via graphical user interface 600 of FIGS. 6A-F, but in a sixth state. In the sixth state, Interface 600 displays additional information related to errors.

These example graphical representations displayed via graphical user interfaces are merely for purposes of illustration. The features described herein may involve graphical representations and/or graphical user interfaces that are configured or formatted differently, include more or less information and/or additional or fewer instructions, include different types of information and/or instructions, and relate to one another in different ways.

These example processes, components, and workflows are merely for purposes of illustration. The features described herein may involve processes, components, and workflows that are configured or formatted differently, include more or less information and/or additional or fewer instructions and/or components, include different types of information and/or instructions and/or components, and relate to one another in different ways.

VI. Example Methods

Figure 7:
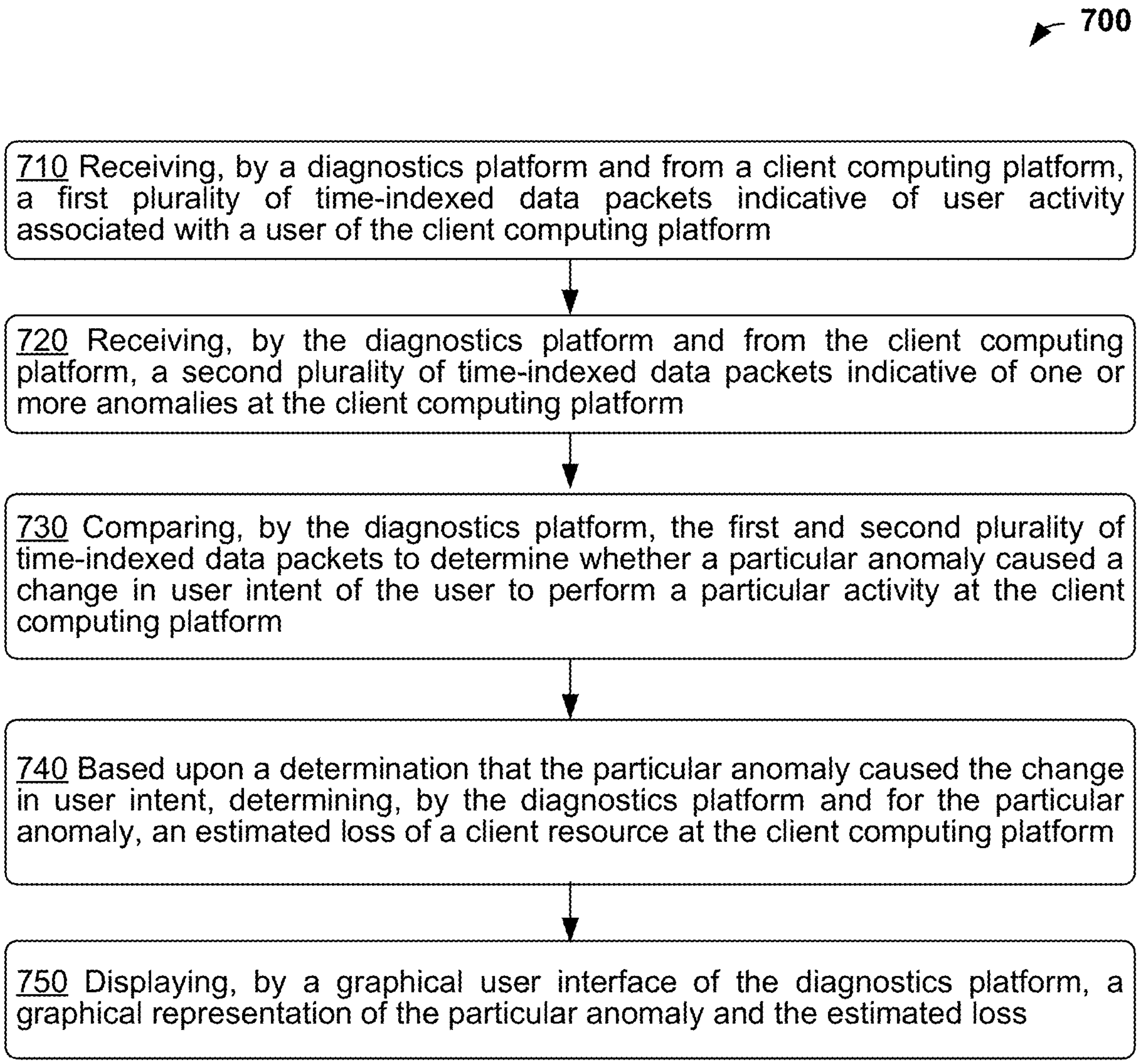
FIG. 7 is a flow chart of an example method.

FIG. 7 is a flow chart of an example method 700.

At block 710, the method 700 can include, receiving, by a diagnostics platform and from a client computing platform, a first plurality of time-indexed data packets indicative of user activity associated with a user of the client computing platform.

At block 720, the method 700 can include, receiving, by the diagnostics platform and from the client computing platform, a second plurality of time-indexed data packets indicative of one or more anomalies at the client computing platform.

At block 730, the method 700 can include comparing, by the diagnostics platform, the first and second plurality of time-indexed data packets to determine whether a particular anomaly caused a change in user intent of the user to perform a particular activity at the client computing platform.

At block 740, the method 700 can include, based upon a determination that the particular anomaly caused the change in user intent, determining, by the diagnostics platform and for the particular anomaly, an estimated loss of a client resource at the client computing platform.

At block 750, the method 700 can include displaying, by a graphical user interface of the diagnostics platform, a graphical representation of the particular anomaly and the estimated loss.

In some examples, the first plurality of time-indexed data packets may include clickstream data associated with the user.

In some examples, the one or more anomalies can include a functional error, a communication error, a missing command error, a syntactic error, an operational error, a control flow error, or a mathematical error.

In some examples, method 700 can include recommending, by the diagnostics platform and based on the estimated loss, one or more mitigation strategies to correct the particular anomaly. In some examples, the recommendation of one or more mitigation strategies to correct the particular anomaly can include (a) generating an error report identifying the particular anomaly and the estimated loss; and (b) providing the error report to a software developer.

In some examples, the client resource can include potential revenue to be generated at the client computing platform based on the particular activity.

In some examples, the client resource can include time spent by the user at the client computing platform.

In some examples, the client resource can include a number of visits to the client computing platform.

In some examples, the client resource can include a compute resource of the client computing platform.

In some examples, method 700 can include (a) determining a plurality of estimated losses at the client computing platform based on a respective plurality of anomalies; (b) ranking the plurality of anomalies based on the plurality of estimated losses; and (c) displaying, by the graphical user interface of the diagnostics platform, graphical representations of the ranked plurality of anomalies.

In some examples, method 700 can include determining a time-indexed context associated with the user, wherein the time-indexed context is indicative of a plurality of parameters related to user experience of the user at the client computing platform. In some examples, the plurality of parameters can include one or more of an origination location, a landing location, a device parameter for a computing device associated with the user, a network bandwidth, a browser configuration, a geographical location of the user, or historical user data.

In some examples, method 700 can include predicting, for a given time, an activity completion probability for the user, wherein the activity completion probability indicates a likelihood that the user will perform the particular activity. The change in user intent can be based on a change in the activity completion probability. In some examples, the predicting of the activity completion probability can be performed by a machine learning model. In some examples, method 700 can include training a machine learning model to perform the predicting of the activity completion probability.

In some examples, the client computing platform can be an electronic commerce platform. The particular activity can be a purchase of an item at the electronic commerce platform. The change in user intent can be based on a decrease in the activity completion probability. The estimated loss can be based on projected loss in revenue.

In some examples, method 700 can include (a) receiving, by the diagnostics platform and from the client computing platform, a third plurality of time-indexed data packets indicative of second user activity associated with a second user of the client computing platform; and (b) comparing, by the diagnostics platform, the first and third plurality of time-indexed data packets to determine whether the particular anomaly caused a second change in second user intent of the second user to perform the particular activity at a particular time at the client computing platform. In some examples, the determining of the estimated loss can include determining an aggregate estimated loss based on a determination that the particular anomaly caused the second change in the second user intent of the second user.

In some examples, method 700 can include (a) based on a determination that the particular anomaly did not cause the second change in the second user intent of the second user, analyzing a time-indexed context associated with the user, wherein the time-indexed context is indicative of a plurality of parameters related to user experience of the user at the client computing platform; and (b) identifying, based on the time-indexed context, a particular parameter of the plurality of parameters that caused the change in the user intent. In some examples, method 700 can include determining a relative activity completion probability for the user, wherein the relative activity completion probability indicates a likelihood that the user will perform the particular activity based on a determination that the second user performed the particular activity.

In some examples, the receiving of the first and second plurality of time-indexed data packets can include collecting the first and second plurality of time-indexed data packets by a software script configured to run at the client computing platform. In some examples, the software script can be a Java script. In some examples, the collecting of the first and second plurality of time-indexed data packets can include crawling the client computing platform.

In some examples, the graphical representation can include one or more of an explanation of the particular anomaly, or an error code that enables a resolution of the particular anomaly.

FIG. 8 is another flow chart of an example method 800.

At block 810, the method 800 can include, determining, by a diagnostics platform and from a client computing platform, a first time series indicative of one or more performance metrics at the client computing platform.

At block 820, the method 800 can include detecting, by the diagnostics platform and based on the first time series, an occurrence of a particular anomaly at a particular time in a performance of the client computing platform.

At block 830, the method 800 can include determining, in response to the detecting and based on a second time series indicative of user activity associated with a user of the client computing platform, whether the particular anomaly caused a change in user intent of the user to perform a particular activity at the client computing platform at the particular time.

At block 840, the method 800 can include, based upon a determination that the particular anomaly caused the change in user intent, determining, by the diagnostics platform and for the particular anomaly, an estimated loss of a client resource at the client computing platform.

At block 850, the method 800 can include displaying, by a graphical user interface of the diagnostics platform, a graphical representation of the particular anomaly and the estimated loss.

VII. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

We claim:

1. A computer-implemented method comprising:

receiving, by a diagnostics platform and from a client computing platform, a first plurality of time-indexed data packets indicative of user activity associated with a user of the client computing platform;

receiving, by the diagnostics platform and from the client computing platform, a second plurality of time-indexed data packets indicative of one or more anomalies at the client computing platform;

comparing, by the diagnostics platform, the first and second plurality of time-indexed data packets to determine whether a particular anomaly caused a change in user intent of the user to perform a particular activity at the client computing platform;

based upon a determination that the particular anomaly caused the change in user intent, determining, by the diagnostics platform and for the particular anomaly, an estimated loss of a client resource at the client computing platform; and displaying, by a graphical user interface of the diagnostics platform, a graphical representation of the particular anomaly and the estimated loss.

2. The computer-implemented method of claim 1, wherein the first plurality of time-indexed data packets comprises clickstream data associated with the user.

3. The computer-implemented method of claim 1, wherein the one or more anomalies comprise one or more of the following: (i) a functional error, (ii) a communication error, (iii) a missing command error, (iv) a syntactic error, (v) an operational error, (vi) a control flow error, or (vii) a mathematical error.

4. The computer-implemented method of claim 1, further comprising:

recommending, by the diagnostics platform and based on the estimated loss, one or more mitigation strategies to correct the particular anomaly.

5. The computer-implemented method of claim 4, wherein the recommending of the one or more mitigation strategies to correct the particular anomaly further comprises:

generating an error report identifying the particular anomaly and the estimated loss; and providing the error report to a software developer.

6. The computer-implemented method of claim 1, wherein the client resource comprises potential revenue to be generated at the client computing platform based on the particular activity.

7. The computer-implemented method of claim 1, wherein the client resource comprises time spent by the user at the client computing platform.

8. The computer-implemented method of claim 1, wherein the client resource comprises a number of visits to the client computing platform.

9. The computer-implemented method of claim 1, wherein the client resource comprises a compute resource of the client computing platform.

10. The computer-implemented method of claim 1, further comprising:

determining a plurality of estimated losses at the client computing platform based on a respective plurality of anomalies;

ranking the plurality of anomalies based on the plurality of estimated losses; and displaying, by the graphical user interface of the diagnostics platform, a graphical representation of the ranked plurality of anomalies.

11. The computer-implemented method of claim 1, further comprising:

determining a time-indexed context associated with the user, wherein the time-indexed context is indicative of a plurality of parameters related to user experience of the user at the client computing platform.

12. The computer-implemented method of claim 11, wherein the plurality of parameters comprise one or more of an origination location, a landing location, a device parameter for a computing device associated with the user, a network bandwidth, a browser configuration, a geographical location of the user, or historical user data.

13. The computer-implemented method of claim 1, further comprising:

predicting, for a given time, an activity completion probability for the user, wherein the activity completion probability indicates a likelihood that the user will perform the particular activity, and wherein the change in user intent is based on a change in the activity completion probability.

14. The computer-implemented method of claim 13, wherein the predicting of the activity completion probability is performed by a machine learning model.

15. The computer-implemented method of claim 13, further comprising:

training a machine learning model to perform the predicting of the activity completion probability.

16. The computer-implemented method of claim 13, wherein the client computing platform is an electronic commerce platform, wherein the particular activity is a purchase of an item at the electronic commerce platform, wherein the change in user intent is based on a decrease in the activity completion probability, and wherein the estimated loss is based on a projected loss in revenue.

17. The computer-implemented method of claim 1, further comprising:

receiving, by the diagnostics platform and from the client computing platform, a third plurality of time-indexed data packets indicative of second user activity associated with a second user of the client computing platform; and comparing, by the diagnostics platform, the first and third plurality of time-indexed data packets to determine whether the particular anomaly caused a second change in second user intent of the second user to perform the particular activity at a particular time at the client computing platform.

18. The computer-implemented method of claim 17, further comprising:

determining of the estimated loss comprises determining an aggregate estimated loss based on a determination that the particular anomaly caused the second change in the second user intent of the second user.

19. The computer-implemented method of claim 17, further comprising:

based on a determination that the particular anomaly did not cause the second change in the second user intent of the second user, analyzing a time-indexed context associated with the user, wherein the time-indexed context is indicative of a plurality of parameters related to user experience of the user at the client computing platform; and identifying, based on the time-indexed context, a particular parameter of the plurality of parameters that caused the change in the user intent.

20. The computer-implemented method of claim 17, further comprising:

determining a relative activity completion probability for the user, wherein the relative activity completion probability indicates a likelihood that the user will perform the particular activity based on a determination that the second user performed the particular activity.

21. The computer-implemented method of claim 1, wherein the receiving of the first and second plurality of time-indexed data packets further comprises:

collecting the first and second plurality of time-indexed data packets by a software script configured to run at the client computing platform.

22. The computer-implemented method of claim 21, wherein the software script is a Java script.

23. The computer-implemented method of claim 21, wherein the collecting of the first and second plurality of time-indexed data packets further comprises:

crawling the client computing platform.

24. The computer-implemented method of claim 1, wherein the graphical representation comprises one or more of an explanation of the particular anomaly, or an error code that enables a resolution of the particular anomaly.

25. A computer-implemented method comprising:

determining, by a diagnostics platform and from a client computing platform, a first time series indicative of one or more performance metrics at the client computing platform;

detecting, by the diagnostics platform and based on the first time series, an occurrence of a particular anomaly at a particular time in a performance of the client computing platform;

determining, in response to the detecting and based on a second time series indicative of user activity associated with a user of the client computing platform, whether the particular anomaly caused a change in user intent of the user to perform a particular activity at the client computing platform at the particular time;

based upon a determination that the particular anomaly caused the change in user intent, determining, by the diagnostics platform and for the particular anomaly, an estimated loss of a client resource at the client computing platform; and displaying, by a graphical user interface of the diagnostics platform, a graphical representation of the particular anomaly and the estimated loss.

26. One or more non-transitory computer-readable media storing software comprising instructions executable by one or more processors that, upon such execution, cause the one or more processors to perform operations comprising:

receiving, by a diagnostics platform and from a client computing platform, a first plurality of time-indexed data packets indicative of user activity associated with a user of the client computing platform;

receiving, by the diagnostics platform and from the client computing platform, a second plurality of time-indexed data packets indicative of one or more anomalies at the client computing platform;

comparing, by the diagnostics platform, the first and second plurality of time-indexed data packets to determine whether a particular anomaly caused a change in user intent of the user to perform a particular activity at the client computing platform;

based upon a determination that the particular anomaly caused the change in user intent, determining, by the diagnostics platform and for the particular anomaly, an estimated loss of a client resource at the client computing platform; and displaying, by a graphical user interface of the diagnostics platform, a graphical representation of the particular anomaly and the estimated loss.

* * * * *